United States Patent
Luitjens et al.

(10) Patent No.: US 12,259,984 B2
(45) Date of Patent: Mar. 25, 2025

(54) DISTRIBUTED COMPUTER ARCHITECTURE FOR PROCESSING DATA

(71) Applicant: Private AI Inc., Toronto (CA)

(72) Inventors: Pieter Luitjens, Toronto (CA); Graham Miller, Toronto (CA)

(73) Assignee: Private AI Inc., Toronto (CA)

( * ) Notice: Subject to any disclaimer, the term of this patent is extended or adjusted under 35 U.S.C. 154(b) by 0 days.

(21) Appl. No.: 18/634,032

(22) Filed: Apr. 12, 2024

(65) Prior Publication Data

US 2024/0346162 A1 Oct. 17, 2024

Related U.S. Application Data

(60) Provisional application No. 63/496,228, filed on Apr. 14, 2023.

(51) Int. Cl.
*G06F 21/62* (2013.01)

(52) U.S. Cl.
CPC ................. *G06F 21/6209* (2013.01)

(58) Field of Classification Search
CPC .................................. G06F 21/6209
See application file for complete search history.

(56) References Cited

U.S. PATENT DOCUMENTS

| | | | |
|---|---|---|---|
| 11,531,846 B1 | 12/2022 | Bodapati et al. | |
| 2012/0303616 A1* | 11/2012 | Abuelsaad | G06F 16/122 707/736 |
| 2019/0236310 A1* | 8/2019 | Austin | G16H 10/60 |
| 2019/0278942 A1 | 9/2019 | Baudart et al. | |
| 2020/0314068 A1* | 10/2020 | Werner | G06F 40/166 |
| 2021/0249002 A1* | 8/2021 | Ahmadidaneshashtiani | G06F 40/284 |
| 2021/0304741 A1 | 9/2021 | Cavallari et al. | |
| 2021/0334455 A1* | 10/2021 | Gkoulalas-Divanis | G06F 40/216 |
| 2021/0383021 A1* | 12/2021 | Nichols | H04L 63/105 |
| 2022/0129771 A1* | 4/2022 | Horesh | G06F 18/213 |
| 2022/0366064 A1* | 11/2022 | Nikoghossian | G06F 21/6254 |
| 2023/0282322 A1* | 9/2023 | Rajkumar | G16H 10/60 705/3 |

OTHER PUBLICATIONS

Extended European Search Report for application No. 24170111.9 dated Sep. 17, 2024, pp. 11.

* cited by examiner

*Primary Examiner* — Jung W Kim
*Assistant Examiner* — Alan L Kong
(74) *Attorney, Agent, or Firm* — Foley & Lardner LLP

(57) ABSTRACT

Presented herein are systems and methods for obfuscating text data elements exchanged with deep learning architectures. A computing system may receive, from a computing device, a first input including a first plurality of data elements to be provided at least in part to a deep learning architecture. The computing system may parse the plurality of data elements of the first input to identify at least one first data element corresponding to an identifier type of a plurality of identifier types. The computing system may generate a second data element corresponding to the identifier type to replace the at least one first data element in the first input. The computing system may generate a first output from the first input by replacing the at least one first data element with the second data element. The computing system may transmit the first output for provision to a deep learning architecture.

20 Claims, 8 Drawing Sheets

DISTRIBUTED COMPUTER ARCHITECTURE FOR PROCESSING DATA

CROSS REFERENCE TO RELATED APPLICATIONS

The present application claims benefit of priority to U.S. Provisional Patent Application No. 63/496,228, titled "Privacy Preserving and Contextually Aware Data Processing," filed Apr. 14, 2023, which is incorporated herein by reference in its entirety.

BACKGROUND

In a networked environment, a computing device may access a resource hosted on a server by sending a request containing information. Upon receipt, the server may process the information of the request to generate an output. The server may return the output including the output to the computing device.

SUMMARY

A server may host and maintain a generative artificial intelligence (AI) model (e.g., a large language model (LLM)) to be accessed by computing devices over the networked environment. The generative AI model may include a network architecture (e.g., a generative transformer model, a recurrent neural network, or sequence modeling) that has been initialized, trained, and established using corpora. The corpora may have been retrieved from various sources, such as electronic documents on a database and information resources on the Internet. A computing device may send a request for generation of an output to the server. The request may include a prompt identifying a set of data elements (e.g., in the form of text, audio, or images) that define the output to be generated by the generative AI model. Upon receipt of the request, the server may process the set of data elements of the prompt by tokenizing each data element and feeding the input set of tokens through the network architecture to output a new set of tokens. The server may generate a response using the output set of tokens, and return the response to the computing device.

The exchange of data between the computing device and the server, however, may result in the exposure of potentially sensitive or confidential information to other entities in the networked environment. These sensitive or confidential information may include, for example, personally identifiable information (PII) (e.g., names, account information, location information, or identification numbers), financial information (e.g., credit card number or transaction details), or health information (e.g., medical records, insurance data, or prescription information), among others. By sending such data, the sensitive or confidential information may be leaked or exfiltrated to other entities through the server, resulting in an increase in security vulnerabilities on the part of a user of the computing device. For one, the exfiltration may lead to compromised system integrity, with malevolent entities gaining otherwise unauthorized access to other systems (e.g., using personally identifiable information). For another, upon gaining access, such entities may access other information about the user, leading to data tampering, theft, or manipulation. Furthermore, these problems may be exacerbated when such information is fed back as part of the corpora to retrain, fine-tune, or update the generative AI model, thereby making the information potentially public as part of the model output.

One existing solutions to the problem of exposure of potentially sensitive or confidential information may include installing another application on the computing device to run checks for such information in prompts. The computational resources, however, in running machine learning models and other complex algorithms for these checks may be burdensome to the computing device, resulting in a downgrade in performance. Another solution may be to perform the check on the server hosting the generative AI model. This approach, however, may not resolve the issue of data leakage and exfiltration, and may not guarantee that the sensitive or confidential information is incorporated into the training data.

To address these and other technical challenges, a proxy service may provide de-identification and re-identification functionalities through an application program interface (API) accessible to the computing devices and servers in the network. Prior to sending the prompt to the server, the computing device may send a request to de-identify the prompt to the proxy service by invoking a corresponding function of the API. Upon receipt, the proxy service may parse the data elements of the prompt using a natural language processing (NLP) model (e.g., a named entity recognition (NER)) to identify one or more data elements as of an identifier type that is sensitive or confidential. For each data element, the proxy service may generate a mapping between the original value of the data element and a placeholder element (e.g., "Adam" and "[Person_001]"). The proxy service may replace the original data element with the placeholder element in the prompt. The proxy service may send a response with the modified (or de-identified) prompt and the mapping to the computing device.

With the receipt of the response, the computing device may send the modified prompt to the server hosting the generative AI model. The server may process the modified prompt by tokenizing each data element and feeding the input set of tokens through the network architecture to output a new set of tokens. The output set of tokens may include at least a portion of the placeholder element (e.g., "[Person]" instead of "[Person_001]"), where the sensitive or confidential information would have been if the prompt were not de-identified. The server may generate a response using the output set of tokens, and return the response to the computing device. The computing device may send a request to re-identify the output with the mapping to the proxy service by invoking a corresponding function of the API on the proxy server. The proxy service in turn may parse the data elements of the output to identify the one or more placeholder elements within. For each placeholder element, the proxy service may identify the original value of the data element from the mapping. With the identification, the proxy service may replace the placeholder element in the output with the original value. The proxy service may send a response with the modified (or re-identified) output to the computing device.

By de-identifying, the proxy service may limit or restrict exposure of sensitive or confidential information in prompts to entities through the server hosting the generative AI model. From restricting exposure of such information from other entities, the proxy service may prevent unauthorized access to sensitive or confidential information as well as other related information, thus reducing the risk or vulnerability to the user or the computing device from data breaches and exfiltration. The proxy service may also lower or eliminate the chances that the sensitive or confidential information becomes integrated into training data to re-train or fine-tune the generative AI model. The decrease in security vulnerabilities to user of the computing device may also enhance system and data integrity.

Furthermore, by preventing incorporation of the sensitive or confidential information into the training data, the quality of outputs from the generative AI model may be enhanced. The proxy service may provide functionalities via the API to the computing device when accessing the generative AI model, thereby improving the utility and capabilities on the part of the computing device and the generative AI model. This may also further save computing resources on the computing device that would have otherwise been spent on performing computationally complex and heavy operations. Relative to approaches that rely on the computing device or the server hosting the generative AI model to perform such checks, running these functionalities on the proxy server may also reduce the chances of data exfiltration and leakage. The proxy service may provide a technical improvement over such existing solutions, in providing functionality to de-identify and re-identify as well as reducing the likelihood of leakage of sensitive and confidential information.

Aspects of the present disclosure are directed to systems and methods for communicating data in distributed computing networks. One or more processors coupled with memory may receive, from a computing device, a first input including a first plurality of data elements to be provided at least in part to a deep learning architecture (or a machine learning model). The one or more processors may parse the plurality of data elements of the first input to identify at least one first data element corresponding to an identifier type of a plurality of identifier types that satisfies a redaction condition. The one or more processors may generate a second data element corresponding to the identifier type to replace the at least one first data element in the first input. The one or more processors may store, in one or more data structures, an association between the at least one first data element and the second data element. The one or more processors may generate a first output from the first input by replacing the at least one first data element with the second data element. The one or more processors may transmit the first output for provision to a deep learning architecture. The one or more processors may receive a second input comprising a model output comprising a third data element including at least the portion of the second data element. The one or more processors may generate, using the one or more data structures storing the association, a second output from the second input by replacing the third data element with the first data element. The one or more processors may transmit, to the computing device, the second output including the first data element.

In some embodiments, the one or more processors may determine, using a machine learning (ML) model, that the third data element of the second output corresponds to the second data element of the first output. The one or more processors may identify the at least one first data element associated with the second data element, responsive to determining that the third data element corresponds to the first data element. The one or more processors may replace the third data element with the first data element identified as associated with the second data element.

In some embodiments, the one or more processors may identify, from a plurality of languages, a language of the plurality of data elements of the first input. The one or more processors may generate the second data element to replace the first data element in accordance with the language of the plurality of data elements. In some embodiments, the one or more processors may delete the association between the at least one first data element and the second data element from the one or more data structures, responsive to transmitting the first output.

In some embodiments, the one or more processors may determine that the at least one first data element does not satisfy a sensitivity condition for the identifier type. The sensitivity condition may specify one or more data elements under exception of the redaction condition. The one or more processors may generate the second data element for the identifier type, responsive to determining that that the at least one first data element does not satisfy the sensitivity condition.

In some embodiments, the one or more processors may receive a session identifier for a session between the computing device and the deep learning architecture. The one or more processors may store, in the one or more data structures, the session identifier for the session. The one or more processors may generate the second output to replace the third data element with the first data element, using the association for the session.

In some embodiments, the one or more processors may obtain, from the computing device via an application programming interface (API), the first input. The one or more processors may provide, to the computing device via the API, the first output. The one or more processors may obtain, from the computing device via the API, the second input. The one or more processors may provide, to the computing device via the API, the second output.

In some embodiments, the one or more processors may provide the first output to the deep learning architecture to generate the model output. The one or more processors may receive the second output including the model output from the deep learning architecture. The one or more processors may provide, to the computing device, the second output. In some embodiments, the one or more processors may transmit, to the computing device, the first output and the one or more data structures storing the association. The one or more processors may receive, from the computing device, the second input and the one or more data structures storing the association.

In some embodiments, the plurality of identifier types may include at least one of: a name, a location, an identification number, an account identifier, or card number. The one or more processors may select, from a plurality of placeholder templates for the corresponding plurality of identifier types, a placeholder template with which to generate the second data element.

BRIEF DESCRIPTION OF THE DRAWINGS

The accompanying drawings constitute a part of this specification, illustrate an embodiment, and, together with the specification, explain the subject matter of the disclosure.

DETAILED DESCRIPTION

Following below are more detailed descriptions of various concepts related to, and embodiments of, systems and methods for communicating data in distributed computing networks. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

Section A describes systems and methods for communicating data in distributed computing networks.

Section B describes a network environment and computing environment which may be useful for practicing various embodiments described herein.

A. Systems and Methods for Communicating Data in Distributed Computing Networks

Figure 1:
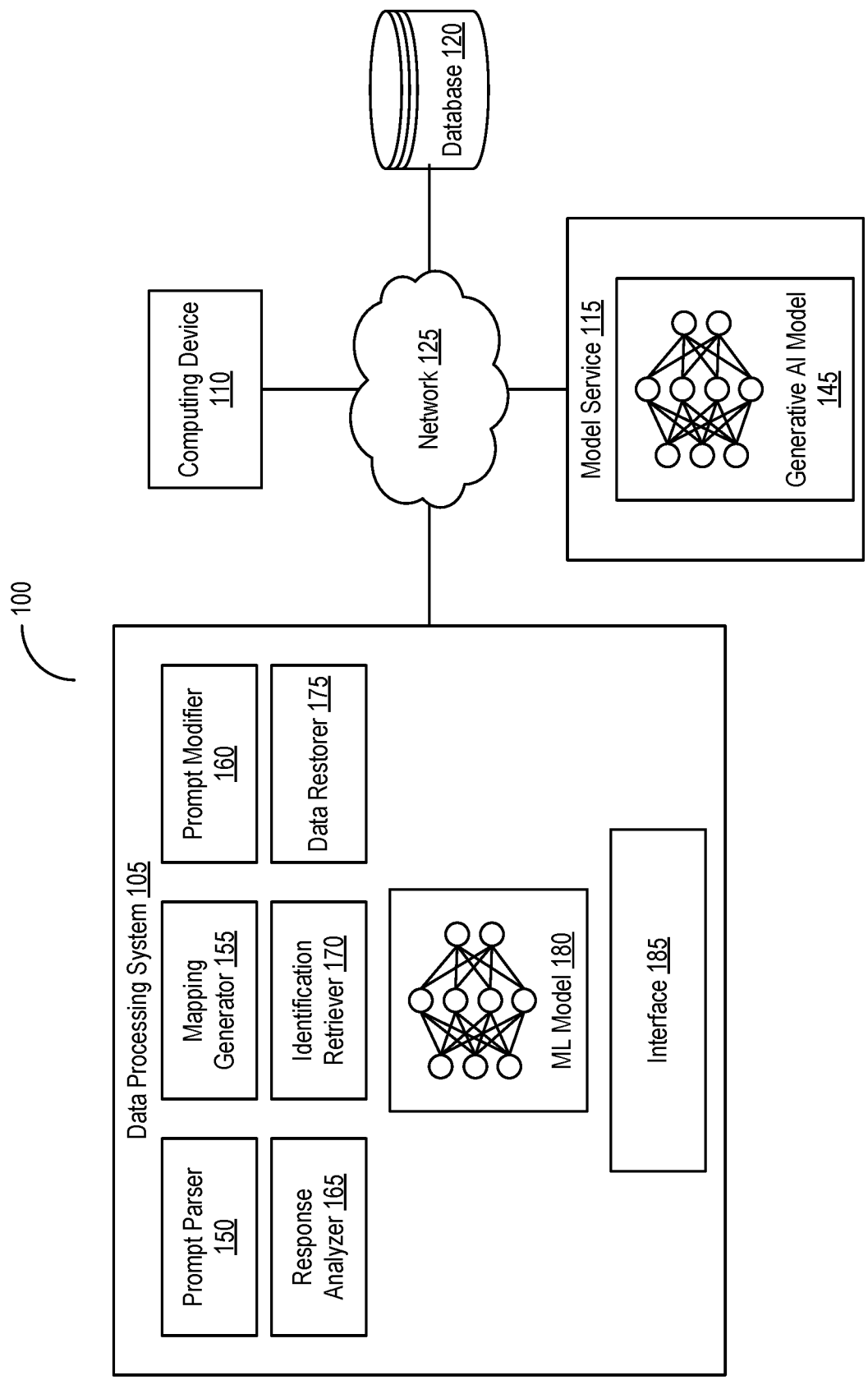
FIG. 1 depicts a block diagram of a system for communicating data in distributed computing networks, in accordance with an illustrative embodiment.

Referring now to FIG. 1, depicted is a block diagram of a system 100 for communicating data in distributed computing networks. The system 100 may include at least one data processing system 105 (also referred herein as a gateway or proxy), at least one computing device 110, at least one model service 115, and at least one database 120, communicatively coupled with one another via at least one network 125, among others. The data processing system 105 may include at least one prompt parser 150, at least one mapping generator 155, at least one prompt modifier 160, at least one response analyzer 165, at least one identification retriever 170, at least one data restorer 175, at least one machine learning (ML) model 180, and at least one interface 185, among others. The model service 115 may include at least one generative AI model 145 (sometimes herein referred to as a deep learning architecture), among others. Each of the components in the system 100 as detailed herein may be implemented using hardware (e.g., one or more processors coupled with memory), or a combination of hardware and software as detailed herein in Section B.

In further detail, the data processing system 105 may (sometimes herein generally referred to as a computing system or a server) be any computing device including one or more processors coupled with memory and software and capable of performing the various processes and tasks described herein. The data processing system 105 can be in communication with the computing device 110, the model service 115, and the database 120, via the network 125. The data processing system 105 may be situated, located, or otherwise associated with at least one server group. The server group may correspond to a data center, a branch office, or a site at which one or more servers corresponding to the data processing system 105 is situated.

On the data processing system 105, the prompt parser 150 may process a prompt using the ML model 180 to identify data elements corresponding to an identifier type to be redacted. The mapping generator 155 may generate a mapping between original values of data elements to be redacted and placeholder elements. The prompt modifier 160 may replace the identified data elements with the placeholder elements using the mapping. The response analyzer 165 may process a model output using the ML model 180 to identify placeholder elements. The identification retriever 170 may identify the original value for placeholder elements using the mapping in the model output. The data restorer 175 may replace the placeholder elements with the original values in the model output.

The ML model 180 may include any network architecture to process prompts and model outputs. The network architecture of the ML model 180 may include a natural language processing (NLP), such as: an information extraction or a named entity recognition (NER) algorithm (e.g., a regular expression, a conditional random field (CRF), a support vector machine (SVM), a transformer model such as bidirectional encoder representations from transformers (BERT), and gated recurrent unit networks (GRUs)) to identify certain types of data elements; a language identification algorithm (e.g., N-gram analysis algorithm, a classifier, or BERT) to detect which language is used in a prompt; an automated speech recognition (ASR) algorithm (e.g., deep learning neural network and hidden Markov model (HMM)) to convert speech in audio into text; a speech synthesizer (e.g., text-to-speech (TTS) conversion such as Formant synthesis or deep learning based synthesizer) to convert text to speech; and an optical character recognition (OCR) (e.g., a computing vision, an artificial neural network (ANN), or clustering algorithms) to convert images into text, among others. In some embodiments, the ML model 180 may include an instance of the generative AI model 145.

The interface 185 may facilitate communications and exchanging of data between the various components of the data processing system 105 and the network 125. The interface 185 may correspond to or use an application programming interface (API) to facilitate the communications and exchanging of data. Various functionalities of the data processing system 105 may be invoked using the API via the interface 185. For instance, the API may define, identify, or otherwise include at least one function to invoke the functionalities of the prompt parser 150, the mapping generator 155, and the prompt modifier 160, and at least one other functionalities to invoke the functionalities of the response analyzer 165, the identification retriever 170, and the data restorer 175, among others. The definition may be in terms of expected inputs from a source device (e.g., the computing device 110) and expected outputs to a destination device (e.g., the computing device 110, the model service 115, or the database 120), among others.

The computing device 110 (sometimes herein referred to as a customer device or a server) may be any computing device comprising one or more processors coupled with memory and software and capable of performing the various processes and tasks described herein. The computing device 110 may be in communication with the data processing system 105, the model service 115, and the database 120, among others, via the network 125. In some embodiments, the computing device 110 may be situated, located, or otherwise associated with at least one server group. For example, the computing device 110 may be another server in communication with the data processing system 105 on behalf of an end-user device. In some embodiments, the computing device 110 may be a smartphone, desktop, tablet computer, wearable computing device, or laptop computer, among others. The computing device 110 may include an application (e.g., a native application or a web application) to access the data processing system 105 and the model service 115, among others. For example, the application may be provided by the data processing system 105 to access the resources of the model service 115.

The model service 115 may be any computing device including one or more processors coupled with memory and software and capable of performing the various processes and tasks described herein. The model service 115 can be in communication with the data processing system 105, the computing device 110, and the database 120, via the network 125. The model service 115 may be situated, located, or otherwise associated with at least one server group. The server group may correspond to a data center, a branch office, or a site at which one or more servers corresponding to the model service 115 is situated. For example, the model service 115 may be implemented using a distributed set of computing devices (with graphics processing unit (GPUs)) communicatively coupled with another with designated interconnects.

The generative AI model 145 may include any network architecture to generate output content using an input prompt. For example, the generative AI model 145 may generate a predicted tokens (e.g., words) from the input tokens (e.g., words) of the prompt. The network architecture for the generative AI model 145 may generally be a deep learning architecture, such as: a transformer model (e.g., a generative pre-trained transformer (GPT), a bidirectional encoder representation transformers (BERT), or a text-to-text transfer transformer (T5)), a state space model (e.g., Mamba), or a recurrent neural network (RNN), among others. The generative AI model 145 may include at least one input, at least one output, and a set of weights arranged in accordance with the network architecture relating the input and output. In some embodiments, the input and output may be of the same modality (e.g., text-to-text, audio-to-audio, or image-to-image). In some embodiments, the input and output may be of different modalities (e.g., text to audio, text to image, audio to text, audio to image, image to audio, or image to text). While the generative AI model 145 is primarily described herein in terms of text inputs and outputs of text, audio or image, any combination of modalities may be processed and generated by the generative AI model 145.

The generative AI model 145 may have been initialized, trained, and established using a corpora (sometimes referred herein as a training dataset). Each corpus may include or identify a set of content (e.g., in the form of text, audio, or image, or any combination thereof). The set of content may be retrieved from a generalized dataset or from a knowledge domain specific dataset, among others. The generative AI model 145 may be trained by processing the corpora to estimate the probabilities of output tokens (e.g., words, a portion of audio, or a portion of image), given an input sequence of tokens (e.g., words, a portion of audio, a portion of image) in the corpus. The training may be in accordance with the protocol for the network architecture. For instance, with artificial neural network (ANN) based network architectures, the training may include updating the set of weights using a loss metric determined from the expected output from the corpus versus the output from the generative AI model 145. The expected output may be acquired via human feedback to facilitate reinforcement learning from human feedback (RLHF). The model service 115 may retrain or update the generative AI model 145 using additional corpora, after the initial training. The additional corpora may in some cases be taken from previously received input prompts.

Figure 2:
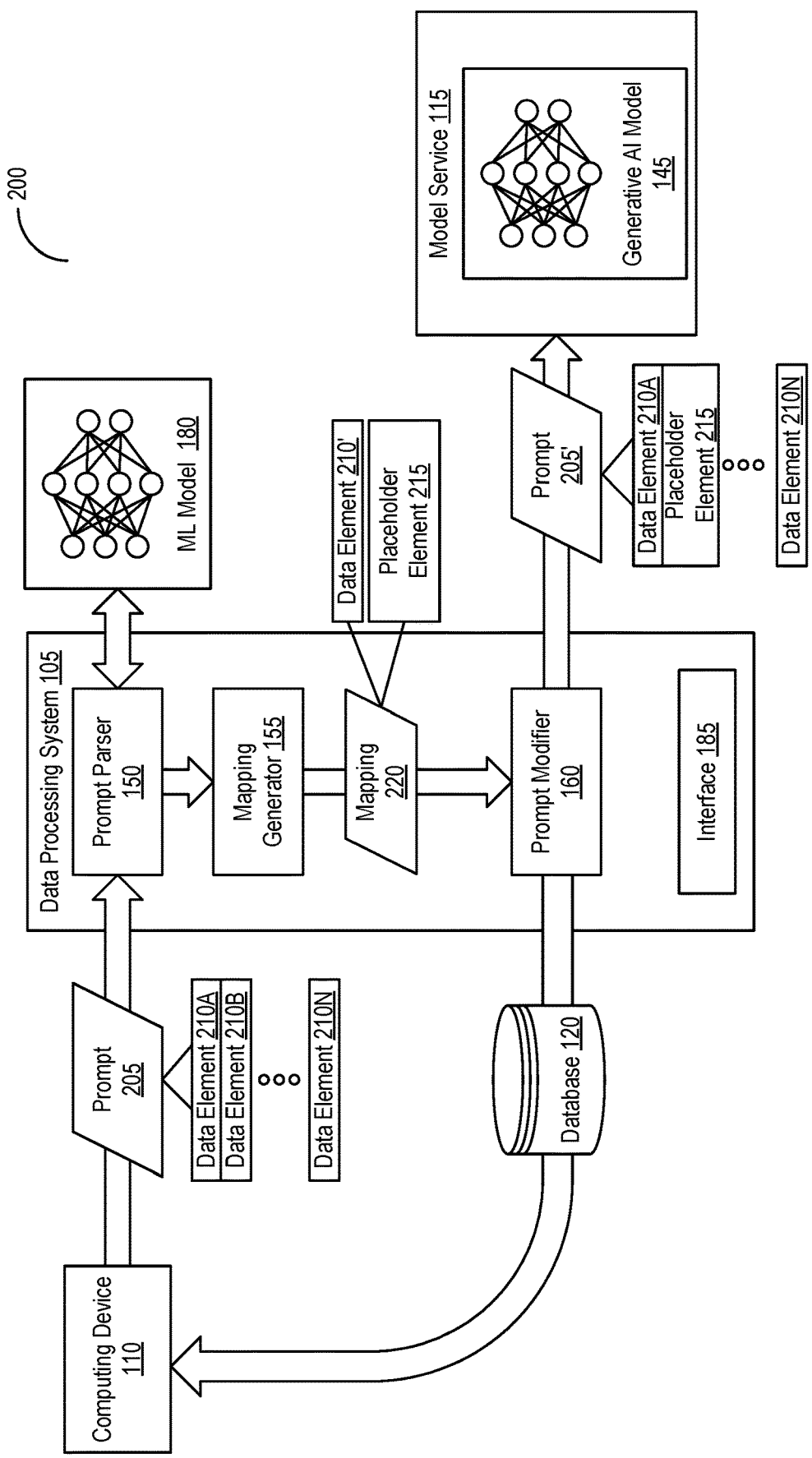
FIG. 2 depicts a block diagram of a process for de-identifying data elements in inputs for deep learning architectures in the system for obfuscating data elements, in accordance with an illustrative embodiment.

Referring now to FIG. 2, among others, depicted is a block diagram of a process 200 for de-identifying data elements in inputs for deep learning architectures. The process 200 may include or correspond to operations to generate mapping to de-identifying data elements in prompts for inputs to be provided to generative AI models. Under the process 200, the computing device 110 may produce, create, or otherwise generate at least one prompt 205 (sometimes herein referred to as a first input). The prompt 205 may include a set of data elements 210A-N (hereinafter generally referred to as data elements 210) to be provided to the generative AI model 145. The set of data elements 210 may be used to define the generation of output from the generative AI model 145. Each data element 210 may include or identify at least one value in a modality of the prompt 205. The modality may define a data type for the elements 210, and may include, for example, text, audio, or image, or any combination thereof. In some embodiments, the prompt 205 may identify or include at least one session identifier. The session identifier may correspond to or identify a session (e.g., a conversation, chat window, or otherwise context) between the computing device 110 and the model service 115 hosting the generative AI model 145. The session may correspond to a conversation log between the prompts from the user of computing device 110 and the outputs from the generative AI model 145.

The prompt 205 may be in any modality, such as a text, audio, images, or multimedia content (e.g., combination of text, audio, or image), among others. When the prompt 205 is text, the data elements 210 may include a corresponding set of strings. When the prompt 205 is audio, the data elements 210 may include a corresponding set of audio segments. When the prompt 205 is an image, the data elements 210 may include a set of image portions. When the prompt 205 is multimedia content, the data elements 210 may include any combination of strings, audio segments, or image portions, among others. The prompt 205 may be generated using user inputs received from a user of the computing device 110. For example, the prompt 205 may include a series of words entered by the user on a graphical user interface element of the application running on the computing device 110. In some embodiments, the prompts 205 may be generated using one or more files. For example, the prompt 205 may include content (e.g., text, audio, images, or multimedia) from the files identified by the user of the computing device 110. The file may include document file (e.g., DOCX, RTF, or PDF formats), an audio file (e.g., WAV, OGG, FLAC, MP3, M4A, or WMA formats), an image file (e.g., BMP, TIFF, JPEG, GIF, PNG, or SVG formats), a multimedia file (e.g., MP4, AAVVI, MOV, WMV, FLV, or MKV file formats), among others.

With the generation, the computing device 110 may provide, transmit, or otherwise send the prompt 205 to the data processing system 105. In some embodiments, the computing device 110 may send the prompt 205 to the data processing system 105 via the API of the interface 185 (e.g., by invoking a function). The prompt parser 150 may retrieve, identify, or otherwise receive the prompt 205 from the computing device 110. In some embodiments, the prompt parser 150 may retrieve, accept, or otherwise obtain the prompt 205 via the API of the interface 185. Upon receipt, the prompt parser 150 may perform processing on the prompt 205 and the set of data elements 210 (e.g., using the ML model 180). In some embodiments, the prompt parser 150 may determine, select, or otherwise identify a language from a set of languages used by the set of data elements 210 of the prompt 205. The identification may be performed by applying the ML model 180 (e.g., language identification algorithm) to the data elements 210 of the prompt 205.

In some embodiments, the prompt parser 150 may determine, select, or otherwise identify a modality of the prompt 205 as at least one of: text, audio, image, or multimedia, among others. When the modality is identified as audio (including audio in multimedia content), the prompt parser 150 may apply the ML model 180 (e.g., automated speech recognition) to extract or identify one or more strings (e.g., words) corresponding to speech in the audio. The text strings extracted from the speech may be used as the data elements 210 of the prompt 205. When the modality is identified as image (including video or image in multimedia content), the prompt parser 150 may apply the apply the ML model 180 (e.g., optical character recognition) to extract or identify one or more strings (e.g., words) corresponding to text in the image content. The text strings extracted from the image may be used as the data elements 210 of the prompt 205 for additional processing.

The prompt parser 150 may process or parse the set of data elements 210 of the prompt 205. In parsing the set of data elements 210, the prompt parser 150 may apply the ML model 180 to the data elements 210 of the prompt 205. From parsing each data element 210, the prompt parser 150 may determine or identify whether the data element 210 corresponds to at least one of a set of identifier types satisfying a redaction condition. In some embodiments, the prompt parser 150 may identify whether the data element 210 corresponds to the identifier type using a rule-based function (e.g., a regular expression) or the ML model 180 (e.g., a named entity recognition (NER) algorithm or information extraction). The redaction condition may define, specify, or otherwise identify identifier types to be removed, replaced, or otherwise redacted from the prompt 205 due to the sensitive or confidential character of the information. The identifier types may identify or include, for example: personally identifiable information (PII) (e.g., names, account information, location information, or identification numbers), financial information (e.g., credit card number or transaction details), health information (e.g., medical records, insurance data, or prescription information), information subject to regulation such as Health Insurance Portability and Accountability Act (HIPAA) or General Data Protection Regulation (GDPR) (e.g., demographic information, genetic data, and biometric data), among others. The identifier types may be configured by an administrator (e.g., of the data processing system 105 or the network associated with the computing device 110).

When the data element 210 does not correspond to any of the identifier types, the prompt parser 150 may determine or identify that the data element 210 does not satisfy the redaction condition. The prompt parser 150 may also identify the data element 210 as to be maintained in the prompt 205. Conversely, when the data element 210 corresponds to at least one of the identifier types, the prompt parser 150 may determine or identify that the data element 210 satisfies the redaction condition. The prompt parser 150 may select or identify the identifier type corresponding to the data element 210. For example, in the prompt 205 with the data elements 210 "John lives at 125 Main Street Anywhere US," the prompt parser 150 may identify "John" as corresponding to a name identifier type and "125 Main Street Anywhere US" as a location identifier type. The prompt parser 150 may identify the data element 210 to be substituted, removed, or otherwise redacted.

In some embodiments, the prompt parser 150 may identify or determine whether the data element 210 satisfies a sensitivity condition for the identifier type. The data element 210 may be identified as corresponding to the identifier type satisfying the redaction condition. The sensitivity condition may specify, define, or otherwise identify values for data elements corresponding to exceptions to the redaction condition. The values for data elements defined by the sensitivity condition may correspond to those with low risk of being sensitive or confidential. For instance, personal identifiers of famous or historical people (e.g., "George Washington," "Napoleon Bonaparte," or "Cleopatra") may be exempt from redaction or replacement from prompts, as these values are less likely to be personal, sensitive, or confidential.

To determine, the prompt parser 150 may compare the value of the data element 210 to the values specified by the sensitivity condition. If the value of the data element 210 corresponds to at least one of the values identified by the sensitivity condition, the prompt parser 150 may determine that the data element 210 satisfies the sensitivity condition. In contrast, if the value of the data element 210 does not correspond to any of the values identified by the sensitivity condition, the prompt parser 150 may determine that the data element 210 does not satisfy the sensitivity condition. When the data element 210 is determined to not satisfy the sensitivity condition, the prompt parser 150 may identify that the data element 210 is not exempt from the redaction condition. The prompt parser 150 may determine that the data element 210 is to be replaced or removed from the prompt 205. Conversely, when the data element 210 is determined to satisfy the sensitivity condition, the prompt parser 150 may identify that the data element 210 is exempt from the redaction condition. The prompt parser 150 may determine that the data element 210 is to be maintained in the prompt 205, despite satisfying the redaction condition.

In some embodiments, the prompt parser 150 may use the ML model 180 to determine whether the data element 210 satisfies the sensitivity condition. The ML model 180 (e.g., named entity recognition or entity classifier) may have been trained using a set of examples. Each example may include values for data elements and a label identified as one of exempt (e.g., to be maintained) or not exempted (e.g., to be replaced) from the redaction condition. The network architecture for the ML model 180 may be based on an artificial neural network (e.g., an encoder network). The ML model 180 may be trained in accordance with supervised learning to distinguish between values of data elements to be exempt and not exempt from the redaction condition. The expected output to compare against may be acquired via human feedback to facilitate reinforcement learning from human feedback (RLHF). With the establishment, the prompt parser 150 may apply the ML model 180 to the data element 210 to determine whether the sensitive condition is satisfies.

With the identification of the data element 210 corresponding to the identifier type satisfying the redaction condition, the mapping generator 155 may produce, write, or otherwise generate at least one placeholder element 215. The placeholder element 215 may correspond to the identifier type of the data element 210 to be replaced (also referred herein as data element 210'). The placeholder element 215 may include a value to anonymize or de-identify the value of the data element 210'. The placeholder element 215 may include at least one fixed portion referencing the identifier type and at least one other unique portion to reference the value of the data element 210'.

To generate the placeholder element 215, the mapping generator 155 may identify or select a placeholder template corresponding to the identifier type of the data element 210'. The placeholder template may be selected from a set of placeholder templates corresponding to the different identifier types. For example, for the data element 210' corresponding to a location identifier type, the template for the placeholder element 215 may include the string "[Location_xxx]" where "xxx" is unique to the data element 210'. The placeholder template may specify or define a format or structure for the generation of the placeholder element 215. The template may also identify or define a function to generate the string unique to the data element 210'. The function may include, for example, a pseudo random value generator to generate random strings or cryptographic tokens (e.g., SHA-256, MD5, or BLAKE algorithms). Using the function, the mapping generator 155 may generate a cryptographic token "asldfj" to include in the placeholder element 215 "[NAME_asldfj]."

Using the selected template, the mapping generator 155 may generate the placeholder element 215. The mapping generator 155 may generate the unique string according to the function specified by the placeholder template. The mapping generator 155 may insert the unique string into the fixed portion of the format as defined by the placeholder template. In some embodiments, the mapping generator 155 may generate the placeholder element 215 in accordance with the language used in the prompt 205. For example, the mapping generator 155 may select or identify the set of placeholder templates for the identified language. From the identified set of templates, the mapping generator 155 may select the placeholder template corresponding to the identifier type. The mapping generator 155 may write the placeholder element 215 in the language used in the prompt 205 in accordance with the template.

The mapping generator 155 may produce, write, or otherwise generate at least one mapping 220 (sometimes herein referred to as an association) between the data element 210' and the placeholder element 215. The mapping 220 may include one or more data structures defining or identifying an association between the value of the data element 210' and the placeholder element 215. The data structure may include, for example, an array, a binary tree, a linked list, a queue, a stack, a heap, a table, a matrix, or an object, among others. With the generation, the mapping generator 155 may store the mapping 220 in the one or more data structures. In some embodiments, the mapping generator 155 may store the session identifier of the prompt 205 with the mapping 220. In some embodiments, the mapping generator 155 may store and maintain the mapping 220 (along with the session identifier) on the database 120 (e.g., for access by the computing device 110). In some embodiments, the mapping generator 155 may store and maintain the mapping 220 (along with the session identifier) locally on the data processing system 105.

The prompt modifier 160 may produce, create, or otherwise generate at least one modified prompt 205' (sometimes herein referred to a first output) using the prompt 205 by replacing the data element 210' with the placeholder element 215. In some embodiments, the prompt modifier 160 may generate the modified prompt 205' by replacing the data element 210' with the placeholder element 215, when the data element 210' is determined to not satisfy the sensitivity condition. Besides the data element 210' substituted with the placeholder element 215, the modified prompt 205' may include the other data elements 210. In the depicted example, the data element 210B may be identified as to be replaced with the placeholder element 215, and the modified prompt 205' may include the remaining data elements 210A and 210N.

In some embodiments, the prompt modifier 160 may synthesize, produce, or otherwise convert the placeholder element 215 to the modality identified for the prompt 205, using the ML model 180. When the modality for the prompt 205 is identified as audio, the prompt modifier 160 may generate an audio sample corresponding to the placeholder element 215 using the speech synthesizer of the ML model 180 (e.g., text-to-speech (TTS)). With the generation, the prompt modifier 160 may add or insert the audio sample corresponding to the placeholder element 215 at a time (e.g., between initial and end time) of the data element 210 in the prompt 205. When the modality for the prompt 205 is identified as image, the prompt modifier 160 may generate an image portion corresponding to the placeholder element 215. Upon generation, the prompt modifier 160 may insert the image portion corresponding to the placeholder element 215 at a location or region corresponding to the data element 210'.

With the generation of the prompt 205', the prompt modifier 160 may send, provide, or otherwise transmit the prompt 205' for provision to the generative AI model 145. In some embodiments, the prompt modifier 160 may transmit at least one of the mapping 220 or the session identifier (or both), along with the prompt 205'. In some embodiments, the prompt modifier 160 may provide the prompt 205' via the API of the interface 185 to the computing device 110. Upon receipt, the computing device 110 may in turn send, provide, or otherwise transmit the prompt 205' to the generative AI model 145 on the model service 115. In some embodiments, the prompt modifier 160 may forward, send, or otherwise transmit the prompt 205' to the generative AI model 145 on the model service 115. In some embodiments, upon transmitting the prompt 205', the prompt modifier 160 may remove, erase, or otherwise delete the mapping 220 from the data structures on the data processing system 105.

Figure 3:
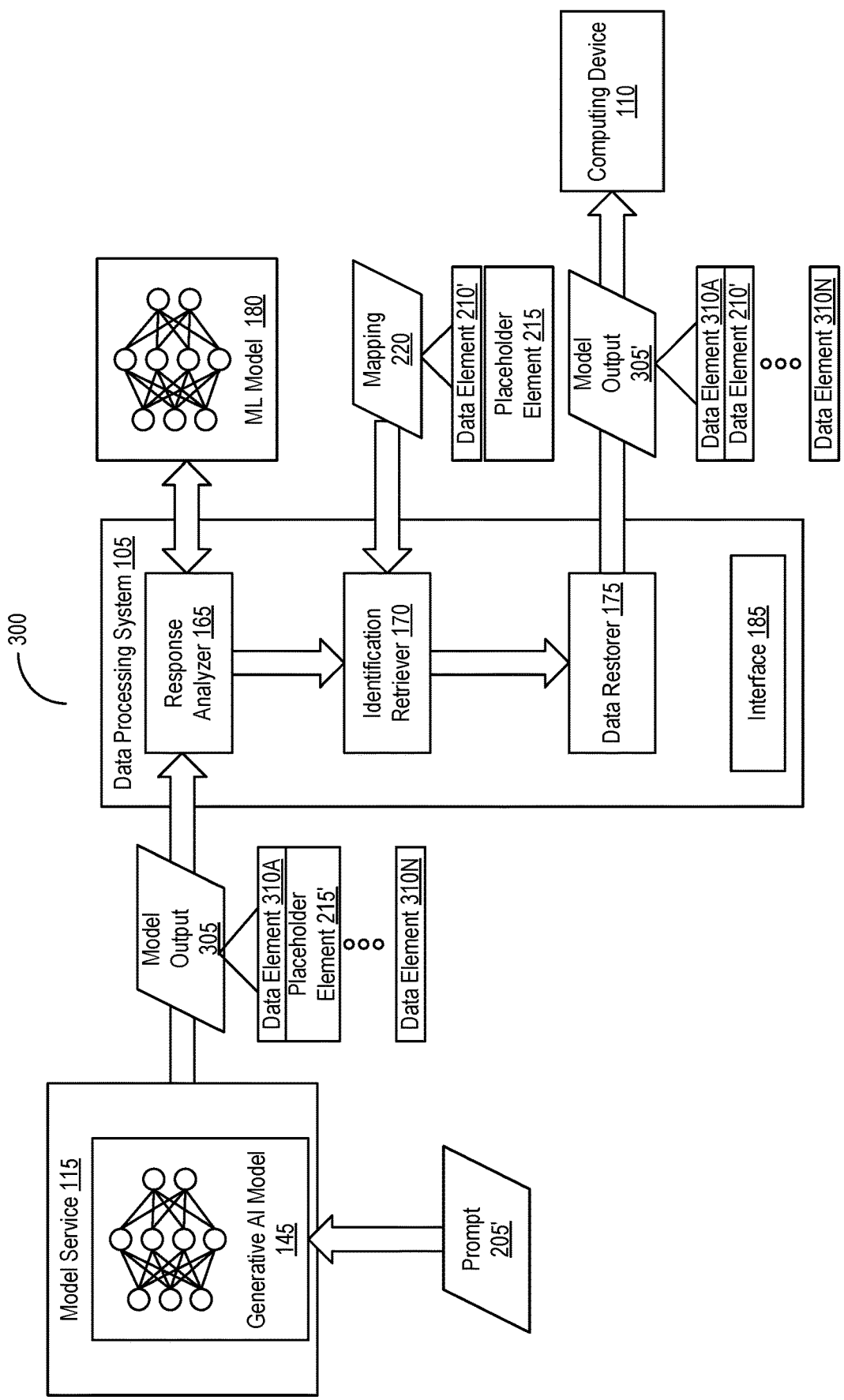
FIG. 3 depicts a block diagram of a process for re-identifying data elements in outputs from deep learning architectures, in accordance with an illustrative embodiment.

Referring now to FIG. 3, depicted is a block diagram of a process 300 for re-identifying data elements in outputs from deep learning architectures. The process 300 may include or include operations to use the mapping to re-identify data elements in outputs from the generative AI models. Under the process 300, the model service 115 may feed, input, or otherwise apply the modified prompt 205' to the generative AI model 145. In applying, the model service 115 may process the data elements 210 and placeholder element 215 of the modified prompt 205' in accordance with the set of weights of the network architecture for the generative AI model 145. From processing, the model service 115 may produce, create, or otherwise generate at least one model output 305 (sometimes herein referred to as a second input). The model output 305 may include a set of data elements 310A-N (hereinafter generally referred to as data elements 310), among others. At least one of the data elements 310 may include or correspond to at least one placeholder element 215'. The placeholder element 215' may include at least a portion of the placeholder element 215 in the prompt 205'. The model output 305 may be in a modality same as or different from the input prompt 205'. The data elements 310 may be in response to the data elements 210 of the prompt 205'.

Upon generation, the model service 115 may send, provide, or otherwise transmit the model output 305. In some embodiments, the model service 115 may transmit the model output 305 to the computing device 110. The computing device 110 may in turn forward, send, or otherwise provide the model output 305 to the data processing system 105 via the API of the interface 185 (e.g., by invoking a function). In some embodiments, the computing device 110 may send the model output 305, along with at least one of the data structures storing the mapping 220 or the session identifier (or both), among others. The response analyzer 165 may retrieve, accept, or otherwise obtain the model output 305 via the API of the interface 185. In some embodiments, the model service 115 may return, provide, or otherwise transmit the model output 305 to the data processing system 105. The response analyzer 165 may retrieve, identify, or otherwise receive the model output 305 from the model service 115.

In some embodiments, the response analyzer 165 may determine, select, or otherwise identify a modality of the prompt 205 as at least one of: text, audio, image, or multimedia, among others. When the modality is identified as audio (including audio in multimedia content), the response analyzer 165 may apply the ML model 180 (e.g., automated speech recognition) to extract or identify one or more strings (e.g., words) corresponding to speech in the audio. The text strings extracted from the speech may be used as the data elements 210 of the prompt 205. When the modality is identified as image (including video or image in multimedia content), the response analyzer 165 may apply the apply the ML model 180 (e.g., optical character recognition) to extract or identify one or more strings (e.g., words) corresponding to text in the image content. The text strings extracted from the image may be used as the data elements 210 of the prompt 205 for additional processing.

With receipt, the response analyzer 165 may process or parse the set of data elements 310 (including the placeholder element 215') of the model output 305. In parsing the model output 305, the prompt parser 150 may apply the ML model 180 to the data elements 310 of the model output 305. From parsing, the response analyzer 165 may detect, select, or otherwise identify the placeholder element 215' from the model output 305. For example, the response analyzer 165 may apply the ML model 180 (e.g., named entity recognition, regular expression, or a local instance of a generative AI model such as a large language model (LLM)) to each data element 310 to identify the placeholder element 215'. In some embodiments, the response analyzer 165 may compare each data element 310 with the placeholder element 215 of the mapping 220. If there is a match between at least one data element 310 and the placeholder element 215, the response analyzer 165 may identify the data element 310 as the placeholder element 215'. Otherwise, if there is no match between any data element 310 and the placeholder element 215, the response analyzer 165 may identify that the model output 305 does not include the placeholder element 215. The response analyzer 165 may traverse through the set of data elements 310 of the model output 305 to identify the placeholder element 215'.

In some embodiments, the response analyzer 165 may identify or determine whether the data element 310 (e.g., the placeholder element 215') corresponds to the placeholder element 215. The placeholder element 215' may at least partially differ from the placeholder element 215. For example, due to the alterations produced by the generative AI model 145, the placeholder element 215 "[Driver_ID_ABCD]" may have been changed to the placeholder element 215' "[Driver_ID_David]". The response analyzer 165 may user the ML model 180 to determine whether the data element 310 corresponds to the placeholder element 215. The ML model 180 (e.g., named entity recognition or entity classifier) may have been trained using a set of examples. Each example may include values for a data element (e.g., different variations of placeholder elements or original values) and a label indicating whether the data element corresponds to the placeholder element. The network architecture for the ML model 180 may be based on an artificial neural network (e.g., an encoder network). The ML model 180 may be trained in accordance with supervised learning to distinguish between placeholder elements and non-placeholder elements. From applying the ML model 180, the response analyzer 165 may determine whether the data element 310 correspond to the placeholder element 215.

The identification retriever 170 may retrieve, select, or otherwise identify the mapping 220 between the placeholder element 215 and the data element 210'. The mapping 220 may be received from the computing device 110 along with the model output 305, the database 120, or locally from the data structures on the data processing system 105, among others. In some embodiments, the identification retriever 170 may retrieve the mapping 220 corresponding to the session identifier provided with the model output 305. For each placeholder element 215' identified in the model output 305, the identification retriever 170 may select or identify the corresponding mapping 220 between the placeholder element 215 and the data element 210'. The placeholder element 215 in the mapping 220 may be identified as corresponding to the placeholder element 215'. From the mapping 220, the identification retriever 170 may retrieve, select, or otherwise identify the data element 210' corresponding to the original value replaced by the placeholder element 215.

The data restorer 175 may produce, create, or otherwise generate at least one modified output 305' (sometimes herein referred to as a second output) using the mapping 220 (e.g., the data structures storing the mapping 220) from the model output 305. To generate the modified output 305', the data restorer 175 may substitute or replace the placeholder element 215' of the model output 305 with the data element 210' identified from the mapping 220 for the placeholder element 215'. When the modality for the model output 305 is identified as audio, the data restorer 175 may add or insert the audio sample corresponding to the original data element 210' in the modified output 305', in place of the placeholder element 215'. When the modality for the model output 305 is identified as image, the data restorer 175 may add or insert the image portion corresponding to the original data element 210' in the modified output 305', in place of the placeholder element 215'. With the generation of the output 305', the data restorer 175 may send, provide, or otherwise transmit the output 305' to the computing device 110. In some embodiments, the data restorer 175 may transmit at least one of the mapping 220 or the session identifier (or both), along with the modified output 305'. In some embodiments, the data restorer 175 may provide the output 305' via the API of the interface 185 to the computing device 110. Upon receipt, the computing device 110 may in turn display, render, or otherwise present the modified output 305' for the user.

In this manner, the data processing system 105 may limit or restrict exposure of certain data elements 210' identified as sensitive or confidential from the model service 115 and the generative AI model 145. The data processing system 105 itself may remove any instances of the mapping 220 between the original data element 210 and the placeholder element 215, further reducing potential exfiltration sources of sensitive or confidential information. With the ability to detect multiple languages, the data processing system 105 may also restrict sensitive or confidential information across various languages. By restricting exposure of such data elements, the data processing system 105 may reduce or eliminate the likelihood of leakage of the sensitive or confidential information via the model service 115 or the generative AI model 145, thereby reducing the security vulnerabilities on the part of the user of the computing device 110. The data processing system 105 may also prevent the incorporation of the sensitive or confidential information into the training dataset for retraining or fine-tuning the generative AI model 145, further protecting the user of the computing device 110 from unauthorized data exfiltration. The quality of output from the generative AI model 145 may also be enhanced, with lower likelihood of hallucinations and drift originating from the incorporation of sensitive or confidential information into the training dataset. The decrease in security vulnerabilities to user of the client device may also enhance system and data integrity.

In addition, as the data processing system 105 is able to perform the de-identification and re-identification using ML model 180, burden on computing resources (e.g., processing and memory) that would be used in applying the ML model 180 on the computing device 110 may be reduced and eliminated. This may free up computing resources on the computing device 110 for other functionalities, such as running the application to access the model service 115. The computing device 110 may also be able to leverage additional functionalities via API function calls on the interface 180 of the data processing system 105. Since these are functionalities that the computing device 110 or model service 115 would otherwise not have, the utility and functionality of the computing device 110 and the model service 115 may be enhanced or increased. Furthermore, relative to approaches that rely on the client device or the model service 115 hosting the generative AI model 145 to perform de-identification and re-identification, running these functionalities on the proxy server may also reduce the chances of data exfiltration and leakage. The data processing system 105 may also facilitate the communications between the computing device 110 and the model service 115 in processing prompts 205 and model outputs 310, thus improving the efficiency of communication of data packets over the network 120.

Figure 4:
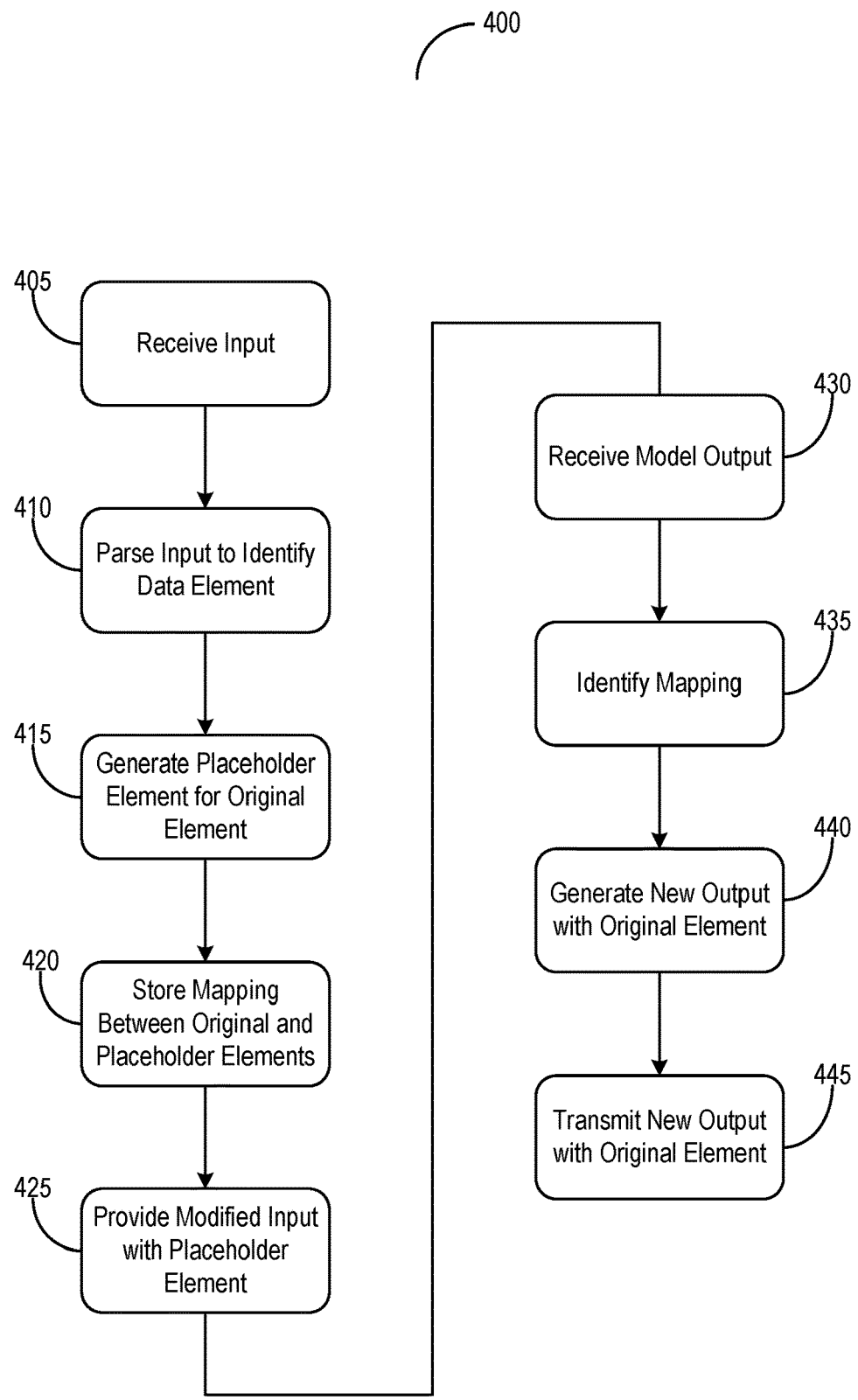
FIG. 4 depicts a flow diagram of a method of communicating data in distributed computing networks, in accordance with an illustrative embodiment.

Referring now to FIG. 4, depicted is a flow diagram of a method 400 of communicating data in distributed computing networks. The method 400 may be implemented or performed using any of the components described herein, such as the data processing system 105, or any combination thereof. Under the method 400, a data processing system may receive an input including a set of data elements (405). The data processing system may parse the input to identify at least one data element to be redacted (410). The data processing system may generate a placeholder element for the original element (415). The data processing system may store a mapping between the original and placeholder elements (420). The data processing system may provide a modified input with the placeholder element (425). The data processing system may receive a model output including at least a portion of the placeholder element (430). The data processing system may identify the mapping between the placeholder element and original element (435). The data processing system may generate a new output with the original element (440). The data processing system may transmit the new output with the original element (445).

Figure 5:
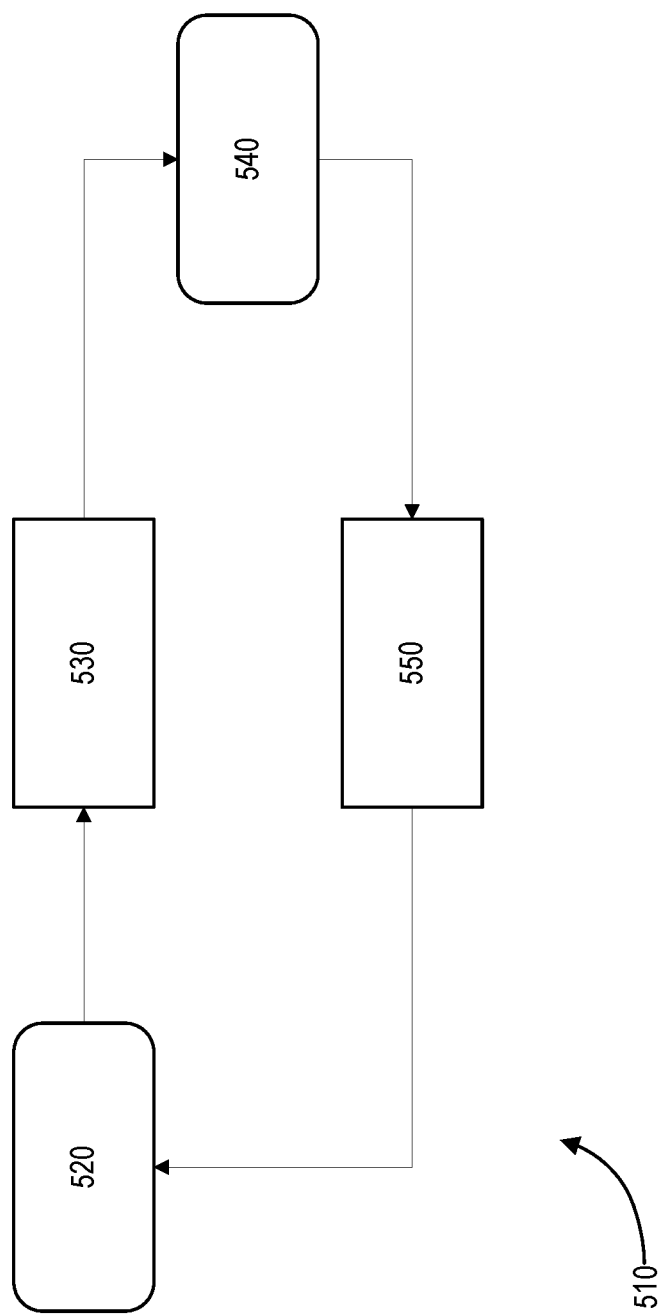
FIG. 5 depicts a block diagram of a system for de-identifying data in accordance with an illustrative embodiment.

Referring now to FIG. 5, among others, depicted is a block diagram of a system 500 for de-identifying data. As depicted, input 520 (perhaps from a user) is received by a first module 530. The first module 530 processes the input and identifies items of identifiable information in the input. The first module 530 then replaces the original items of identifiable information with replacement items of identifiable information. The now modified output is then sent to an external processor 540. The external processor 540 then produces a response. The response is received by a second module 550. The second module 550 identifies the instances of replacement items of identifiable information in the response and replaces these replacement items of identifiable information with their counterpart original items of identifiable information. The resulting modified response is then sent back to the origin of the input (e.g., the user).

The input may be text-based input or audio-based input. Examples of the processing and of the system for use with text-based input are provided below. Examples and explanations where the input is audio-based input are provided further below in this document.

As an example of the processing, in an implementation where the input is text-based input, the original text-based input may be:

Hi, I'm Denise and I'm 25 and live in San Francisco. How do I use a ABCD product?

After the first module processes the text-based input, the modified text-based output that is produced may be:

Hi, I'm Rebecca and I'm 27 and live in Palo Alto. How do I use a ABCD product?

As can be seen, the original identifiable information, a user's name (Denise), has been replaced with a replacement identifiable information, another name (Rebecca). Similarly, the age (25) has been replaced with another comparable age (25) and the original location (San Francisco) has been replaced with another comparable location (Palo Alto). Preferably, names used as original identifiable information are replaced with another name with a matching gender. Thus, as an example, the original item of identifiable information of Thomas would be replaced by the replacement item of identifiable information of Benjamin. Similarly, an original item of identifiable information of a specific location (e.g., a city) would be replaced with a replacement item of identifiable information of another location in the same vicinity. Thus, an original location of Toronto may be replaced by a replacement location of Mississauga, an adjacent city/suburb in the same area.

It should, however, be clear that the first module only replaces identifiable information that may relate to a user or an origin of the text-based input and not data that may be related to a query or topic of the chat. As an example of this, the query above asks about how to use a ABCD product. The identifiable information relating to the user (i.e., the user's name, age, and location) are replaced but the name/brand of the item that is the subject of the query (i.e., Dyson) is not replaced. Similarly, queries relating to specific locations (such as queries asking for directions) would not have their specific locations replaced. Thus, if a user enters a query such as:

I live in Syracuse, but I am going to New York City. Please give me driving directions from Newark New Jersey to downtown Manhattan.

The first module would, preferably, replace the location of Syracuse but would not replace any of the other locations in the query.

After the modified text-based output has been generated by the first module and has been sent to the external processor, the external processor may provide a suitable text-based response. This text-based response is then received by the second module. Much like the first module, the second module identifies the replacement items of identifiable information found in this text-based response. However, unlike the first module, the second module only replaces these replacement items of identifiable information with their original items of identifiable information as originally found in the text-based input. Thus, continuing the example given above, in response to the query about how to use a ABCD product, the external processor may provide a text-based response as:

Hi Rebecca! You can find instructions for ABCD products at www.dyson.com/dryers

Or, if the external processor operates to not directly respond to the query, the response may be:

Hi Rebecca, females who are 25-30 years old who live in California should watch out for skin cancer.

After the second module processes this text-based response, the modified text-based response that is sent to the user would be:

Hi Denise! You can find instructions for ABCD products at www.dyson.com/dryers

Or, if the external processor had not directly responded to the query but instead referred to skin cancer as above, the response sent to the user would be:

Hi Denise, females who are 25-30 years old who live in San Francisco should watch out for skin cancer.

As can be seen, the user's original name (from the original query) has been replaced into the text-based response. Similarly, the user's original location (San Francisco) has been reintegrated into the text-based response instead of the modified location (California).

To be able to perform this, the first module stores the mapping between each original item of identifiable information and its corresponding replacement item of identifiable information after each original item of identifiable information has been replaced by its corresponding replacement item of identifiable information in the modified text-based output. This mapping is then accessed by the second module and, after the relevant replacement items of identifiable information in the text-based response have been identified, these replacement items of identifiable information are then replaced by their corresponding original items of identifiable information. After the replacement, the resulting modified text-based response is sent back to the text-based input origin.

To accomplish the above, the first module and the second module are each equipped with a trained model for identifying items of identifiable information. The first module's trained model is trained to not just identify items of identifiable information but also to identify the context of each of these items of identifiable information so that items of identifiable information relevant to a query or to the context of the text-based input are not replaced. As an example of this, location information relating to a query for directions or location information relating to the subject of the text-based input would not be replaced.

The second module's trained model is similarly trained to identify items of identifiable information in the text-based response. These items of identifiable information can then be cross-referenced with the stored mapping between the original items of identifiable information and the corresponding replacement items of identifiable information. The identified replacement items of identifiable information in the text-based response are then replaced with their corresponding original items of identifiable information. In some instances, the text-based response may use different forms or different versions of the replacement items of identifiable information and, as such, this steps may be as simple as correlating the terms in the text-based response with the stored mapping of items of identifiable information.

The trained model for the second module is, preferably, able to recognize not just the items of identifiable information in the text-based response but to also identify similarities between identified items of identifiable information and the expected replacement items of identifiable information. As an example, the expected replacement items of identifiable information may be the name WILLIAM. However, the text-based response may use the diminutive version of BILL instead of WILLIAM. Or, as another example, the expected item may be SAMMY but the term in the text-based response may be SAM. As yet another example as illustrated by the Rebecca/Denise interaction above, the user's original location of San Francisco was replaced by the external processor with California. The trained model identifies the replacement item of "California' and replaces this with the original item of "San Francisco". Note that, the location sent to the external processor was "Palo Alto" and not "California".

It should also be clear that the first and the second module are both capable of replacing the relevant items of identifiable information with the relevant replacement. For the first module, the original item of identifiable information is replaced with the replacement item of identifiable information. For the second module, the identified replacement item of identifiable information is replaced with the correspondingly mapped original item of identifiable information.

In one configuration, the first module and the second module each have two submodules, one submodule that includes a trained model for identifying items of identifiable information and one submodule for replacing the relevant identified items of identifiable information as necessary.

Figure 6:
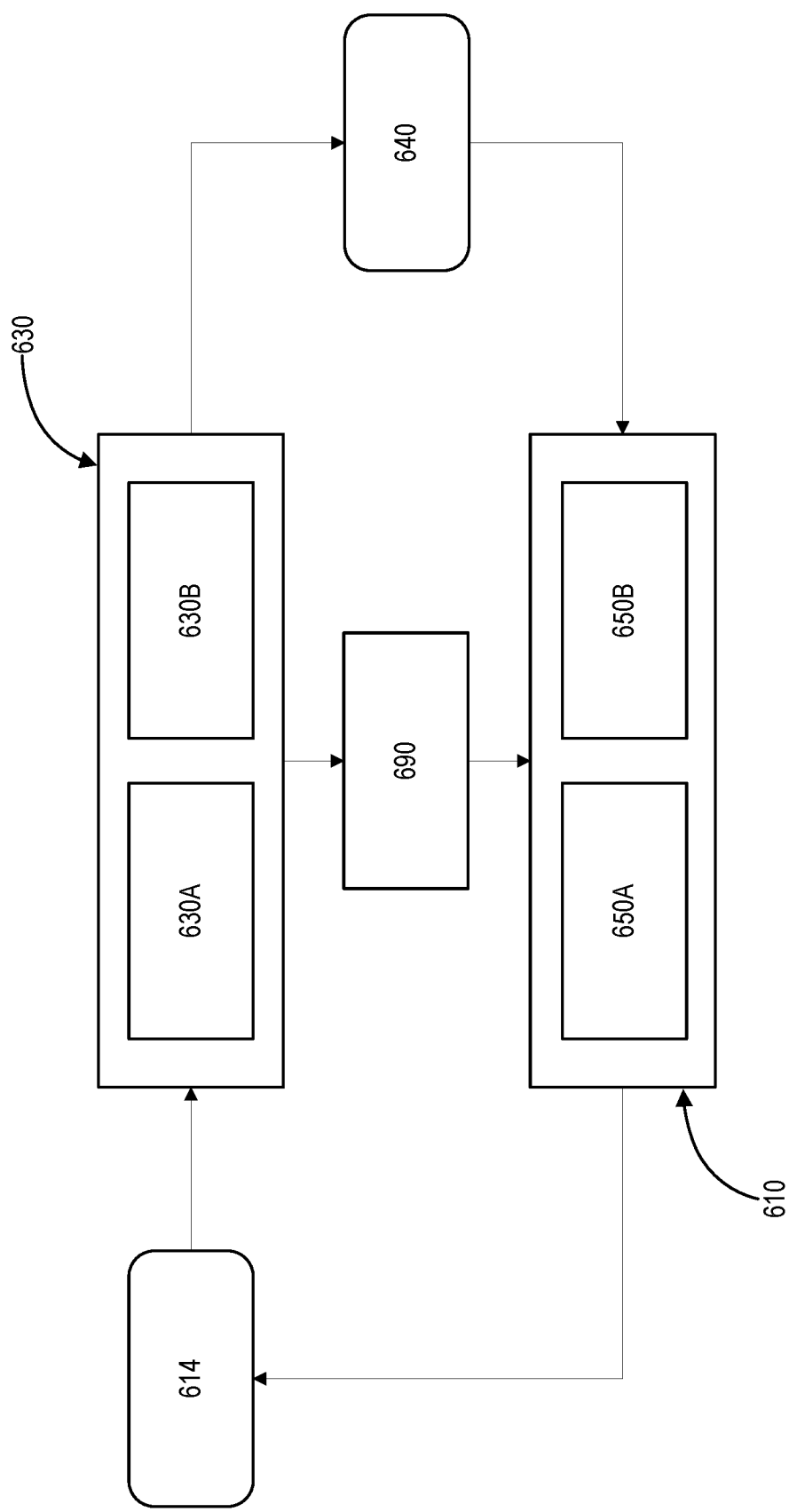
FIG. 6 depicts a block diagram of a system for re-identifying data in accordance with an illustrative embodiment.

Referring now to FIG. 6, among others, depicted is a block diagram of a system 600 for re-identifying data. The first module 630 is illustrated as having a submodule 630A and a submodule 630B. Similarly, the second module 650 is illustrated as having submodule 650A and submodule 650B. In terms of function, submodules 630A and 650A are trained AI/ML models that take in, as input, text and identify the items of identifiable information within that text. When necessary, the items of identifiable information are contextualized such that those items that are necessary for the context of the text are identified as being not replaceable (e.g., specific locations in a query asking for directions).

The other submodules 630B and 650B replace the relevant items of identifiable information as necessary, taking into account the circumstances of the items being replaced. As examples, the submodule 630B would replace proper names with other proper names of the correct gender, ages would be replaced with comparable ages, locations would be replaced with locations are the near the original location or locations that are at least comparable. For dates and numbers that are to be replaced, the submodule 630B may simply adjust the numbers and dates as necessary to arrive at their replacement values. As an example, an age of 35 may be adjusted to be 32 or 36 as necessary. A date of Jun. 6, 2016, may be adjusted to Jul. 9, 2017 if necessary.

The submodule 630B may consult/query a database of replacement identifiable information to find suitable replacement items of identifiable information. The database may be a small one with a set number of replacement names for female names and a set of replacement names for male names. In addition, the database may have a more extensive list of replacement locations that may be used to replace original items of identifiable information that are locations. For ease of use, a set number of replacement locations may be used for regions or areas as necessary. As an example, a listing of 200 replacement locations may be used to replace locations located on the west coast of the US and a listing of 200 replacement locations may be used to replace locations located on the east coast of the US.

As an alternative to the above, the submodule 630B may synthetically generate the replacement items of identifiable information instead of querying a database. The synthetically generated replacement items may then be used as detailed above. Submodule 630B would also operate to store the mapping of the original items of identifiable information with the replacement items of identifiable information. The mapping data would be stored in storage 690 as shown in FIG. 2. Once the modified text output has been generated, this modified text output is sent to the external processor.

The submodule 650B, in contrast to the submodule 630B which may query a potentially extensive database, or which may synthetically generate the replacement items, consults the storage 614 to find the mapping of the replacement items of identifiable information identified in the text-based response. This enables the submodule 650B to retrieve the original item of identifiable information that was originally in the text-based input and to replace the identified items in the text-based response. As noted above, the submodule 650B may have the ability to recognize different forms of names, locations, numbers, etc. to properly correlate the mapped replacement items with the original items. Once the correct mapping data has been retrieved and correlated, the submodule 650B replaces the relevant replacement items of identifiable information in the text-based response with their corresponding original items of identifiable information to arrive at the modified text-based response.

The text-based input may originate directly from a user (as in the text-based input may be directly entered by a user) or from another source that generates text-based input that may have items of identifiable information. Such text-based input may be, as noted above, queries to chatbots, chat messages destined for a chatbot, chat messages destined for an online chat session with a chatbot or a human, or any other input to an online interaction for which there may be a need or desire to shield items of identifiable information. Similarly, the external processor may be a server implementing chat functions between multiple users, chatbot functionality, an online message forum, or any other functionality (e.g., natural language processing (NLP) algorithms such as sentiment or lexical analysis) relating to online interactions that may involve items of identifiable information.

In some embodiments, the system may operate as a plug-in to a web browser such that a user's chat input is anonymized (i.e., processed by the system) prior to being posted as a chat message. For such an implementation, each browser instance (e.g., a tab on the browser) may have its own mapping storage such that a user Pam's items of identifiable information are mapped differently on different tabs in the same browser. Thus, in this example, Pam may be chatting in one chat box in tab A and chatting in another chat box in tab B of the same browser instance. The mapping used in tab A is independent of the mapping used in tab B to ensure that Pam's items of identifiable information are suitably anonymized and/or protected.

Alternatively, in another implementation, the system may be deployed as a standalone application on a user's computer/device. The user can designate which applications need to have their inputs and outputs monitored and/or modified by the standalone application to protect the user's items of identifiable information. As an example, a user can designate the Discord app so that any posts and/or direct messages destined for the Discord app are intercepted and any items of identifiable information are replaced by the standalone application. Similarly, any outputs from the Discord app are intercepted and the replacement items of identifiable information in the output are replaced with their original counterparts. For ease of use, the mapping of original items to replacement items may be preserved across a session of use to ensure consistency of information in a chat/messaging session.

The consistency of mapping may be preserved for one or more sessions as desired if the user wishes to preserve an online replacement identity across sessions or across a single chat/interaction session. As an example, if a user is in a direct message interaction session with another user in an online bulletin board, the mapping of original items to replacement items may be preserved to be consistent in that session/interaction. Thus, the user's name Pam may be mapped to the name Penny throughout that session/interaction such that the person at the other end of the interaction is not alarmed by a changing user's name in the interaction. This would ensure that any input from Pam that identifies her name as Pam would have instances of "Pam" be replaced by "Penny" throughout the interaction session. The mapping can then be discarded once the session is over or once the user designates that a new mapping may be desired.

Of course, as may be imagined, if each user interaction with the external processor is a one-off or is unique such that a mapping is not necessary to be preserved across a session, a different mapping may be generated for each text-based input and text-based response sequence. Thus, as an example, for a chatbot interaction, each user text input and its corresponding response from the chatbot has a single mapping that may be discarded once the corresponding response has been received and processed.

As another implementation, the system may operate on a server through which a user routes her online chat/direct messages/interactions. This server would thus operate as a gateway or filter to the user's online interaction and would ensure that any items of identifiable information that the user may provide (whether by mistake, inadvertence, or design) are suitably replaced.

As noted above, the input may be text based or audio based. Details regarding an implementation for a text-based input and a text-based output are given above. For an audio-based input and output, the processing is somewhat similar as for the text-based case. For an audio-based input, the input is transcribed with time stamps for all or most of the elements of the input. The resulting transcription of the audio-based input is then analyzed for items of identifiable information, much like the text-based input.

The analysis will identify the various items of identifiable information in the transcription. Suitable replacement items of identifiable information are then synthetically generated such that the generated replacement items of identifiable information are, preferably, matched with the original items of identifiable information to be replaced. As with the text-based input case, it is preferred that the replacement items of identifiable information generated be comparable to the original item of identifiable information to be replaced. The generating the replacement items of identifiable information, for the audio-based input, involves synthetically generating audio replacement items of identifiable information. That is, audio clips are generated as necessary. These synthetically generated audio clips are, preferably, adjusted to be comparable to the quality and/or characteristics of the original audio-based input. Thus, if the original audio-based input is that of a female sounding voice, the audio clips that are to be used as replacement items of identifiable information are preferably also of a female sounding voice.

After the relevant audio clips of the replacement items of identifiable information have been generated, these audio clips are then inserted into the audio-based input to replace the audio original items of identifiable information. This is performed using the time stamps from the transcription. As an example, if the original audio-based input transcription shows that the name MARY appears between time stamps 1.00 second and 1.05 second, the audio between these time stamps is then removed (and saved) and the relevant audio replacement item of identifiable information (e.g., an audio clip of the name "ANNIE") is inserted in the audio-based input between those time stamps. This is repeated until all the original items of identifiable information have been replaced in the audio-based input to result in an audio based modified output.

As with the text-based input, the original items of identifiable information to be replaced are contextually determined so that only the relevant items of identifiable information are tagged for replacement. For example, as noted above, brand names or locations relating to a query would not be replaced. However, names, ages, and locations relating to a user, or which may not be relevant to the query, or the interaction may be tagged for replacement.

It should also be clear that, as with the text-based input, the replacement items of identifiable information for the audio-based input may be generated using a database lookup or the replacement items of identifiable information may be synthetically generated. Regardless of how the replacement items of identifiable information are generated, these replacement items are then processed through an audio generator such that an audio clip of the replacement item (e.g., a name, location, or a number such as an age) is generated. As noted above, preferably the audio clip is processed so that the sound characteristics of the clip (e.g., the voice, timbre, pitch, volume, etc.) are comparable if not the same as the rest of the original audio-based input.

After the external processor has received the audio based modified output, depending on the query or the interaction or the configuration of the external processor, the external processor may provide a response to the modified audio-based output from the first module. When the external processor provides such a response and if the response is audio based, this audio-based response is then received by the second module.

After the second module receives the audio-based response, the process executed is somewhat similar to that executed by the first module. The received audio-based response is first transcribed such that the transcript includes time stamps for at least portions if not all portions of the response. The transcript with time stamps is then analyzed to recognize/identify the replacement items of identifiable information. The analysis is executed in conjunction with a stored copy of the replacement items used by the first module to correlate the original items with the replacement items used in the response. Once the replacement items have been identified, using the time stamps, the clips of the original items removed/replaced from the original audio-based input are placed in the audio-based response in place of the identified replacement items clips. This is performed in much the same manner, with the help of the time stamps, as the original items were replaced in the input by the replacement items. After the replacement items have been replaced by their corresponding original items, the resulting modified response is then sent back to the source of the original input.

As can be seen, in the case of the audio-based input, the input is first turned into a text-based transcription and the relevant items of identifiable information are then contextually identified in much the same manner as with the text based input. Relevant replacement items of identifiable information are then generated, and audio clips of these replacement items are generated and used to replace the original identified items of identifiable information in the audio-based input. The resulting modified output is then sent to the external processor. An audio-based response from the external processor is then received and is processed in an analogous manner. That is, the audio-based response is transcribed, the relevant replacement items are identified in the transcript, and the clips of those replacement items in the audio-based response are replaced using the clips of the original items removed from the original audio based input. Of course, instead of storing the clips of the original items removed from the original input, the text of the removed original items may be saved along with the mapping to the relevant replacement items. The text of the removed original items may then be used to generate audio clips used in replacing the replacement items identified in the audio-based response.

In terms of implementation, the first and second modules of the system for an audio-based input may be similar in structure as shown in FIG. 2. That is, the first module 630 may have two submodules 630A, 630B and the second module 650 may also have two submodules 650A, 650B. For the audio-based input, the first module's first submodule 630A transcribes the audio-based input (with relevant time stamps) and analyzes the transcript to identify the items of identifiable information. The items of identifiable information are then passed, along with the original audio-based input, to the second submodule 630B. The second submodule 630B then generates audio based (or clips) replacement items of identifiable information and replaces the audio clips of the original items of identifiable information from the audio-based input. The replaced clips or the text of the replaced clips are then stored in storage 690.

After an audio-based response is received from the external processor 640, this audio-based response is received by the first submodule 650A of the second module 650. This first submodule 650A transcribes the audio-based response (with time stamps) and identifies the replacement items used in the response. These are then correlated with the original items stored in the storage 690 so that the relevant original items (either the text or the actual audio clip) can be retrieved. If necessary, the audio clips of the original items are generated. The second submodule 650B then reintegrates/inserts the original items into the response to result in a modified response. This modified response is then sent back to the source.

In some embodiments, the system can be adjustable such that the redaction intensity can be controllable. For this variant, the redaction intensity can be adjusted from HIGH, MEDIUM, or LOW. With a high redaction intensity, only identifiable information that is of high risk for identifying a particular person is redacted/replaced. For the high redaction intensity, clear PII (personally identifiable information) is replaced such as full names, credit card information, social security number, etc. For the medium redacting intensity, in addition to the clear PII, other quasi-identifiers that might identify someone or locate someone are replaced. For the medium redacting intensity, information such as a person's height, location, and other such data is replaced. As an example, if the data details "The subject is 180 cm tall and lives in Delaware" then the height and the location are replaced. Similarly, if the data details that "[t]he customer's routing number is 000-018" then the routing number is replaced.

For a low redaction intensity, in addition to the above identifiable information, other identifiable information, even information that is not related to specific individuals or which may be reasonably assumed to be public knowledge, is replaced. Thus, for a low redaction intensity, all names, locations, addresses, and any identifiable information is replaced. As an example, if the data details that "[t]he CN Tower is in Toronto" then the terms "CN Tower" and the location of "Toronto" are to be replaced. Similarly, if the data details that "Brad Pitt is starring in a new movie", then the name "Brad Pitt" is replaced, even if the actor's name is well-known. Thus, for a low redaction intensity setting, all or practically identifiable information is replaced, regardless of the identification risk, even if the identifiable information has a low risk of identifying a person. For a high redaction intensity setting, only identifiable information that has a high risk of identifying a specific person is replaced. Thus, specific identifiable information that can be related back to a specific person/user is replaced for a high redaction intensity setting. For a low redaction intensity setting, even non-specific identifiable information that may not relate to a specific person/user is replaced.

In yet another embodiment, the system may be used with text-based documents. As examples, the system can operate on different document types such as PDF, JSON, XML, DOC, DOCX, or even images. For this embodiment, the text-based document is analyzed and identifiable information in the document is replaced to result in a scrubbed document that is output by the system. Of course, the mapping between the original identifiable information and replacements are saved so that the replacement can be reversed in a document that is received in return. Thus, for an outgoing document that is received from a source, if the original identifiable information of TONY is mapped to the replacement identifiable information BILL, then the outgoing scrubbed document will have all instances of the name TONY replaced by BILL. Similarly, the document destined to be returned to the source will have all instances of the name BILL replaced by the original name TONY.

In a further variant, the system may also track what identifiable information has been found in the incoming audio/text/document from the source. An indication of the identifiable information found in the input from the source can then be provided to users or sysadmin users by way of a dashboard. This allows for organizations using the system to be notified of what identifiable information and how much identifiable information is being used/sent by members of the organization.

Figure 7:
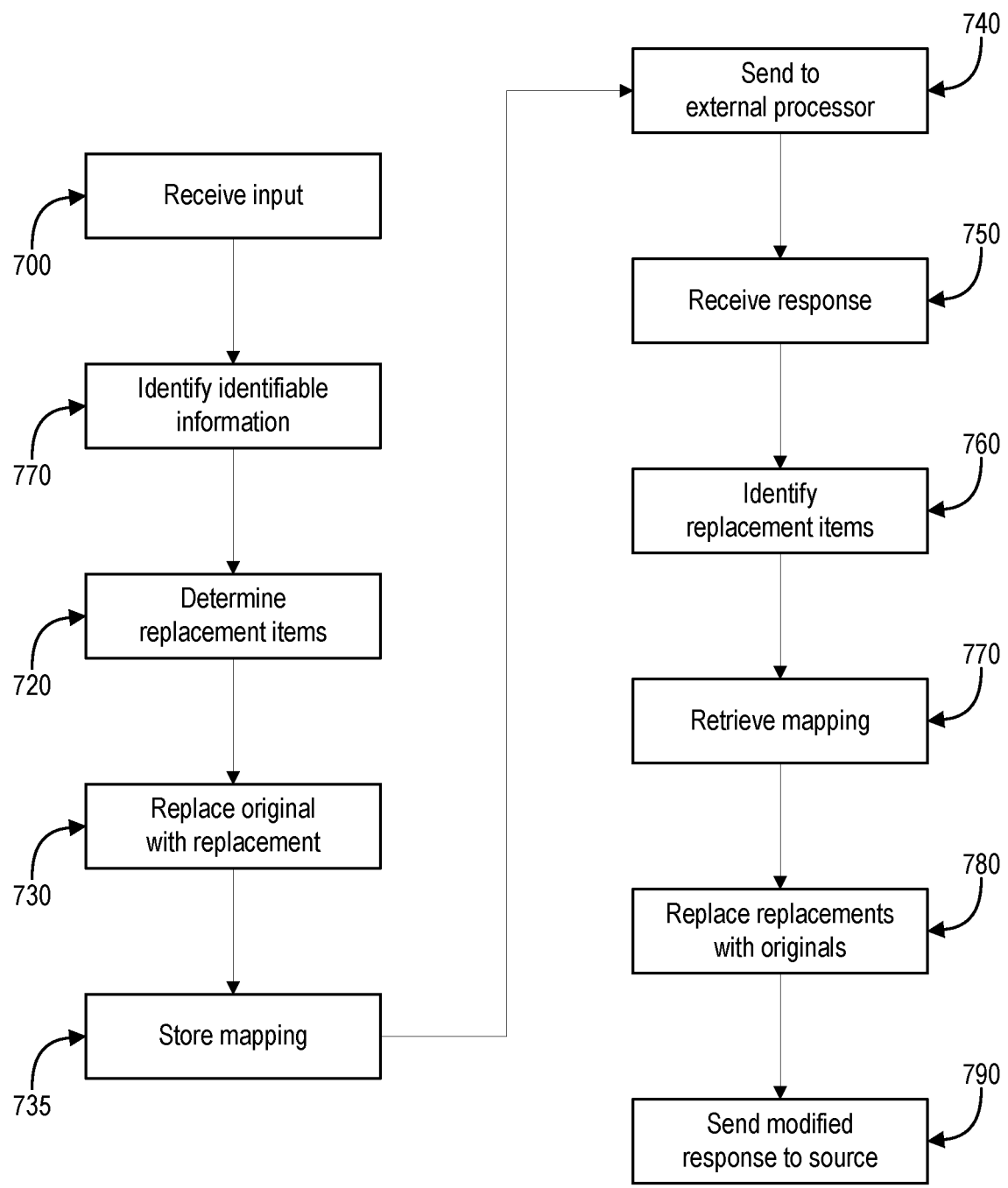
FIG. 7 depicts a flow diagram of a method of de-identifying and re-identifying data, in accordance with an illustrative embodiment.

Referring now to FIG. 7, among others, depicted is a flow diagram of a method of de-identifying and re-identifying data. As can be seen, the method for processing an input (whether text based or audio based) begins at step 700, that of receiving the input from a source. The input can be received directly from a user or from some other source of input. Step 710 is that of identifying the original items of identifiable information in the input. For a text-based input, this simply requires contextually determining items of identifiable information. For an audio-based input, this involves transcribing the audio-based input (with time stamps) and contextually analyzing the text based transcript. The next step (step 720) is that of determining replacement items of identifiable information for these identified original items of identifiable information. As noted above, for the text-based input, this step can be performed by generating the replacement items or by consulting/accessing a database of replacement items. For the audio-based input, this step involves not just generating the replacement items of identifiable information but also generating the corresponding audio clips.

Once the replacement items have been determined/generated, then the original items of identifiable information are replaced by the replacement items (step 730). This replacement can be easily accomplished for the text-based input by replacing the text. For the audio-based input, the audio clips of the original items are removed and replaced by the audio clips of the replacement items. A mapping of the original items and the replacement items used to replace the original items are then stored (step 735). The resulting modified output is then sent to an external processor (step 740).

Step 750 is then that of receiving a response from the external processor. This response may be a direct response to the modified output sent in step 740. After this, the replacement items of identifiable information are identified in the response (step 760). Identifying the replacement items for the text-based case is done by contextually analyzing the response. For the audio-based case, this may involve generating a transcript of the audio-based response (with time stamps) and analyzing this transcript. The analysis would identify the replacement items in the transcript and, accordingly, the relevant replacement item audio clips in the audio-based response. As noted above, the replacement items of identifiable information are the same as or are related to the replacement items of identifiable information determined in step 720. Once the replacement items have been identified, the mapping of these identified replacement items are then retrieved/consulted (step 770). The original items mapped to the identified replacement items are then determined from the retrieved mapping and the original items are replaced/reintegrated in the response (step 780). As noted above, for the audio-based case, the audio clips of the original items are used to replace the audio clips of the replacement items in the response. The resulting modified response is then sent to the source of the input (step 790).

B. Computing and Network Environment

Figure 8:
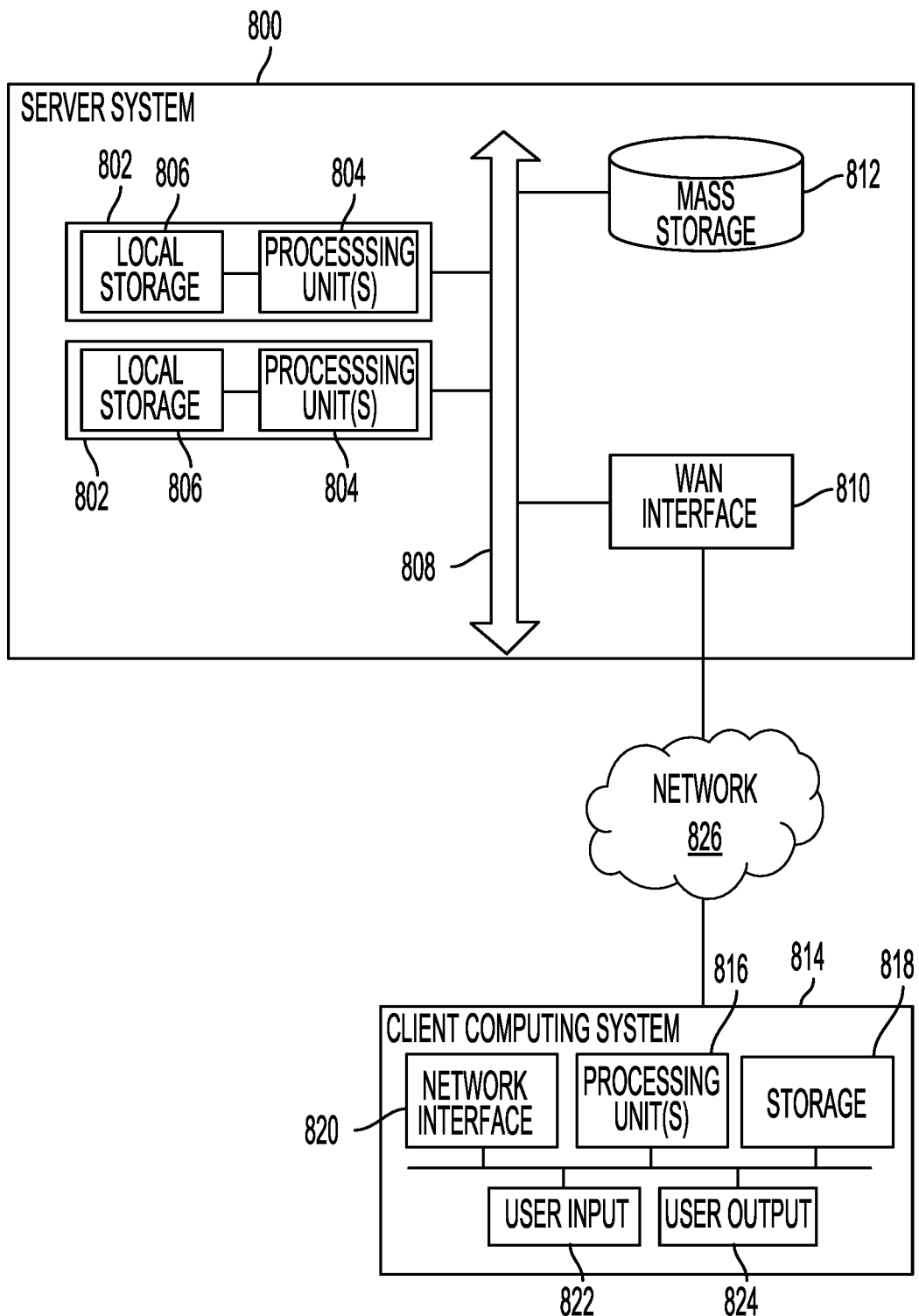
FIG. 8 depicts a block diagram of a server system and a client computer system, in accordance with one or more implementations.

Various operations described herein can be implemented on computer systems. FIG. 8 shows a simplified block diagram of a representative server system 800, client computing system 814, and network 826 usable to implement certain embodiments of the present disclosure. In various embodiments, server system 800 or similar systems can implement services or servers described herein or portions thereof. Client computing system 814 or similar systems can implement clients, described herein. The systems 100 described herein can be similar to the server system 800. Server system 800 can have a modular design that incorporates a number of modules 802 (e.g., blades in a blade server embodiment); while two modules 802 are shown, any number can be provided. Each module 802 can include processing unit(s) 804 and local storage 806.

Processing unit(s) 804 can include a single processor, which can have one or more cores, or multiple processors. In some embodiments, processing unit(s) 804 can include a general-purpose primary processor as well as one or more special-purpose co-processors, such as graphics processors, digital signal processors, or the like. In some embodiments, some or all processing units 804 can be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 804 can execute instructions stored in local storage 806. Any type of processors in any combination can be included in processing unit(s) 804.

Local storage 806 can include volatile storage media (e.g., DRAM, SRAM, SDRAM, or the like) and/or non-volatile storage media (e.g., magnetic or optical disk, flash memory, or the like). Storage media incorporated in local storage 806 can be fixed, removable, or upgradeable as desired. Local storage 806 can be physically or logically divided into various subunits, such as a system memory, a read-only memory (ROM), and a permanent storage device. The system memory can be a read-and-write memory device or a volatile read-and-write memory, such as dynamic random-access memory. The system memory can store some or all of the instructions and data that processing unit(s) 804 need at runtime. The ROM can store static data and instructions that are needed by processing unit(s) 804. The permanent storage device can be a non-volatile read-and-write memory device that can store instructions and data even when module 802 is powered down. The term "storage medium" as used herein includes any medium in which data can be stored indefinitely (subject to overwriting, electrical disturbance, power loss, or the like) and does not include carrier waves and transitory electronic signals propagating wirelessly or over wired connections.

In some embodiments, local storage 806 can store one or more software programs to be executed by processing unit(s) 804, such as an operating system and/or programs implementing various server functions such as functions of the system 100 or any other system described herein, or any other server(s) associated with system 100 or any other system described herein.

"Software" refers generally to sequences of instructions that, when executed by processing unit(s) 804, cause server system 800 (or portions thereof) to perform various operations, thus defining one or more specific machine embodiments that execute and perform the operations of the software programs. The instructions can be stored as firmware residing in read-only memory and/or program code stored in non-volatile storage media that can be read into volatile working memory for execution by processing unit(s) 804. Software can be implemented as a single program or a collection of separate programs or program modules that interact as desired. From local storage 806 (or non-local storage described below), processing unit(s) 804 can retrieve program instructions to execute and data to process in order to execute various operations described above.

In some server systems 800, multiple modules 802 can be interconnected via a bus or other interconnect 808, forming a local area network that supports communication between modules 802 and other components of server system 800. Interconnect 808 can be implemented using various technologies including server racks, hubs, routers, etc.

A wide area network (WAN) interface 810 can provide data communication capability between the local area network (interconnect 808) and the network 826, such as the Internet. Technologies can be used, including wired (e.g., Ethernet, IEEE 802.3 standards) and/or wireless technologies (e.g., Wi-Fi, IEEE 802.11 standards).

In some embodiments, local storage 806 is intended to provide working memory for processing unit(s) 804, providing fast access to programs and/or data to be processed while reducing traffic on interconnect 808. Storage for larger quantities of data can be provided on the local area network by one or more mass storage subsystems 812 that can be connected to interconnect 808. Mass storage subsystem 812 can be based on magnetic, optical, semiconductor, or other data storage media. Direct attached storage, storage area networks, network-attached storage, and the like can be used. Any data stores or other collections of data described herein as being produced, consumed, or maintained by a service or server can be stored in mass storage subsystem 812. In some embodiments, additional data storage resources may be accessible via WAN interface 810 (potentially with increased latency).

Server system 800 can operate in response to requests received via WAN interface 810. For example, one of the modules 802 can implement a supervisory function and assign discrete tasks to other modules 802 in response to received requests. Work allocation techniques can be used. As requests are processed, results can be returned to the requester via WAN interface 810. Such operation can generally be automated. Further, in some embodiments, WAN interface 810 can connect multiple server systems 800 to each other, providing scalable systems capable of managing high volumes of activity. Other techniques for managing server systems and server farms (collections of server systems that cooperate) can be used, including dynamic resource allocation and reallocation.

Server system 800 can interact with various user-owned or user-operated devices via a wide-area network such as the Internet. An example of a user-operated device is shown in FIG. 8 as client computing system 814. Client computing system 814 can be implemented, for example, as a consumer device such as a smartphone, other mobile phone, tablet computer, wearable computing device (e.g., smart watch, eyeglasses), desktop computer, laptop computer, and so on.

For example, client computing system 814 can communicate via WAN interface 810. Client computing system 814 can include computer components such as processing unit(s) 816, storage device 818, network interface 820, user input device 822, and user output device 837. Client computing system 814 can be a computing device implemented in a variety of form factors, such as a desktop computer, laptop computer, tablet computer, smartphone, other mobile computing device, wearable computing device, or the like.

Processing unit(s) 816 and storage device 818 can be similar to processing unit(s) 804 and local storage 806 described above. Suitable devices can be selected based on the demands to be placed on client computing system 814; for example, client computing system 814 can be implemented as a "thin" client with limited processing capability or as a high-powered computing device. Client computing system 814 can be provisioned with program code executable by processing unit(s) 816 to enable various interactions with server system 800.

Network interface 820 can provide a connection to the network 826, such as a wide area network (e.g., the Internet) to which WAN interface 810 of server system 800 is also connected. In various embodiments, network interface 820 can include a wired interface (e.g., Ethernet) and/or a wireless interface implementing various RF data communication standards, such as Wi-Fi, Bluetooth, or cellular data network standards (e.g., 3G, 4G, LTE, etc.).

User input device 822 can include any device (or devices) via which a user can provide signals to client computing system 814; client computing system 814 can interpret the signals as indicative of particular user requests or information. In various embodiments, user input device 822 can include any or all of a keyboard, touch pad, touch screen, mouse or other pointing device, scroll wheel, click wheel, dial, button, switch, keypad, microphone, and so on.

User output device 837 can include any device via which client computing system 814 can provide information to a user. For example, user output device 837 can include display-to-display images generated by or delivered to client computing system 814. The display can incorporate various image generation technologies, e.g., a liquid crystal display (LCD), light-emitting diode (LED), including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that functions as both input and output device. In some embodiments, other user output devices 837 can be provided in addition to or instead of a display. Examples include indicator lights, speakers, tactile "display" devices, printers, and so on.

Some embodiments include electronic components, such as microprocessors, storage, and memory that store computer program instructions in a computer readable storage medium. Many of the features described in this specification can be implemented as processes that are specified as a set of program instructions encoded on a computer readable storage medium. When these program instructions are executed by one or more processing units, they cause the processing unit(s) to perform various operations indicated in the program instructions. Examples of program instructions or computer code include machine code, such as is produced by a compiler, and files including higher-level code that are executed by a computer, an electronic component, or a microprocessor using an interpreter. Through suitable programming, processing unit(s) 804 and 816 can provide various functionality for server system 800 and client computing system 814, including any of the functionality described herein as being performed by a server or client, or other functionality.

It will be appreciated that server system 800 and client computing system 814 are illustrative and that variations and modifications are possible. Computer systems used in connection with embodiments of the present disclosure can have other capabilities not specifically described here. Further, while server system 800 and client computing system 814 are described with reference to particular blocks, it is to be understood that these blocks are defined for convenience of description and are not intended to imply a particular physical arrangement of component parts. For instance, different blocks can be but need not be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present disclosure can be realized in a variety of apparatus including electronic devices implemented using any combination of circuitry and software.

While the disclosure has been described with respect to specific embodiments, one skilled in the art will recognize that numerous modifications are possible. Embodiments of the disclosure can be realized using a variety of computer systems and communication technologies, including, but not limited to, specific examples described herein. Embodiments of the present disclosure can be realized using any combination of dedicated components, programmable processors, and/or other programmable devices. The various processes described herein can be implemented on the same processor or different processors in any combination. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may refer to specific hardware and software components, those skilled in the art will appreciate that different combinations of hardware and/or software components may also be used and that particular operations described as being implemented in hardware might also be implemented in software or vice versa.

Computer programs incorporating various features of the present disclosure may be encoded and stored on various computer readable storage media; suitable media includes magnetic disk or tape, optical storage media such as compact disk (CD) or digital versatile disk (DVD), flash memory, and other non-transitory media. Computer readable media encoded with the program code may be packaged with a compatible electronic device, or the program code may be provided separately from electronic devices (e.g., via Internet download or as a separately packaged computer-readable storage medium).

Thus, although the disclosure has been described with respect to specific embodiments, it will be appreciated that the disclosure is intended to cover all modifications and equivalents within the scope of the following claims.

What is claimed is:

1. A method comprising:
receiving, by one or more processors, from a client device, a first input including a first plurality of data elements to be provided at least in part to a deep learning architecture;
parsing, by the one or more processors, the plurality of data elements of the first input to identify at least one first data element corresponding to an identifier type of a plurality of identifier types that satisfies a redaction condition;
generating, by the one or more processors, a second data element corresponding to the identifier type to replace the at least one first data element in the first input;
storing, by the one or more processors, in one or more data structures, an association between the at least one first data element and the second data element;
generating, by the one or more processors, a first output from the first input by replacing the at least one first data element with the second data element;
transmitting, by the one or more processors, the first output for provision to a deep learning architecture;
receiving, by the one or more processors, a second input comprising a model output comprising a third data element generated by the deep learning architecture based on the second data element of the first output;
determining, by the one or more processors, that the third data element is an altered form of the second data element;
identifying, by the one or more processors, the at least one first data element associated with the second data element, responsive to determining that the third data element is the altered form of the second data element;
generating, by the one or more processors, using the one or more data structures storing the association, a second output from the second input by replacing the third data element with the at least one first data element identified as associated with the second data element; and transmitting, by the one or more processors, to the client device, the second output including the at least one first data element.

2. The method of claim 1, wherein determining that the third data element is the altered form further comprises determining using a machine learning (ML) model, that the third data element of the second output is the altered form of the second data element of the at least one first output.

3. The method of claim 1, further comprising identifying, by the one or more processors, from a plurality of languages, a language of the plurality of data elements of the first input, and
wherein generating the second data element further comprises generating the second data element to replace the at least one first data element in accordance with the language of the plurality of data elements.

4. The method of claim 1, further comprising deleting, by the one or more processors, the association between the at least one first data element and the second data element from the one or more data structures, responsive to transmitting the first output.

5. The method of claim 1, further comprising determining, by the one or more processors, that the at least one first data element does not satisfy a sensitivity condition for the identifier type, wherein the sensitivity condition specifies one or more data elements under exception of the redaction condition, and
wherein generating the second data element further comprises generating the second data element for the identifier type, responsive to determining that that the at least one first data element does not satisfy the sensitivity condition.

6. The method of claim 1, wherein receiving the first input further comprises receiving a session identifier for a session between the client device and the deep learning architecture,
wherein storing the association further comprises storing, in the one or more data structures, the session identifier for the session,
wherein generating the second output further comprises generating the second output to replace the third data element with the at least one first data element, using the association for the session.

7. The method of claim 1, wherein receiving the first input further comprises obtaining, from the client device via an application programming interface (API), the first input,
wherein transmitting the first output further comprises further comprises providing, to the client device via the API, the first output,
wherein receiving the second input further comprises obtaining, from the client device via the API, the second input, and
wherein transmitting the second output further comprises providing, to the client device via the API, the second output.

8. The method of claim 1, wherein transmitting the first output further comprises providing the first output to the deep learning architecture to generate the model output,
wherein receiving the second output further comprises receiving the second output including the model output from the deep learning architecture, and
wherein transmitting the second output further comprises providing, to the client device, the second output.

9. The method of claim 1, wherein transmitting the first output further comprises transmitting, to the client device, the first output and the one or more data structures storing the association, and wherein receiving the second input further comprises receiving, from the client device, the second input and the one or more data structures storing the association.

10. The method of claim 1, wherein the plurality of identifier types further comprises at least one of: a name, a location, an identification number, an account identifier, or card number, and
wherein generating the second data element further comprises selecting, from a plurality of placeholder templates for the corresponding plurality of identifier types, a placeholder template with which to generate the second data element.

11. A system, comprising:
one or more processors coupled with memory, configured to:
receive, from a client device, a first input including a first plurality of data elements to be provided at least in part to a deep learning architecture;
parse the plurality of data elements of the first input to identify at least one first data element corresponding to an identifier type of a plurality of identifier types that satisfies a redaction condition;
generate a second data element corresponding to the identifier type to replace the at least one first data element in the first input;
store, in one or more data structures, an association between the at least one first data element and the second data element;
generate a first output from the first input by replacing the at least one first data element with the second data element;
transmit the first output for provision to a deep learning architecture;
receive a second input comprising a model output comprising a third data element generated by the deep learning architecture based on the second data element;
determine that the third data element is an altered form of the second data element;
identify the at least one first data element associated with the second data element, responsive to determining that the third data element is the altered form of the second data element;
generate, using the one or more data structures storing the association, a second output from the second input by replacing the third data element with the at least one first data element identified as associated with the second data element; and
transmit, to the client device, the second output including the at least one first data element.

12. The system of claim 11, wherein the one or more processors are configured to:
determine, using a machine learning (ML) model, that the third data element of the second output is the altered form of the second data element of the first output.

13. The system of claim 11, wherein the one or more processors are configured to:
identify, from a plurality of languages, a language of the plurality of data elements of the first input, and
generate the second data element to replace the at least one first data element in accordance with the language of the plurality of data elements.

14. The system of claim 11, wherein the one or more processors are configured to delete the association between the at least one first data element and the second data element from the one or more data structures, responsive to transmitting the first output.

15. The system of claim 11, wherein the one or more processors are configured to:
- determine that the at least one first data element satisfies a sensitivity condition for the identifier type, wherein the sensitivity condition specifies one or more data elements under exception of the redaction condition; and
- generate the second data element for the identifier type, responsive to determining that that the at least one first data element satisfies the sensitivity condition.

16. The system of claim 11, wherein the one or more processors are configured to:
- receive a session identifier for a session between the client device and the deep learning architecture;
- store, in the one or more data structures, the session identifier for the session; and
- generate the second output to replace the third data element with the at least one first data element, using the association for the session.

17. The system of claim 11, wherein the one or more processors are configured to:
- obtain, from the client device via an application programming interface (API), the first input,
- provide, to the client device via the API, the first output,
- obtain, from the client device via the API, the second input, and
- provide, to the client device via the API, the second output.

18. The system of claim 11, wherein the one or more processors are configured to:
- provide the first output to the deep learning architecture to generate the model output;
- receive the second output including the model output from the deep learning architecture; and
- provide, to the client device, the second output.

19. The system of claim 11, wherein the one or more processors are configured to:
- transmit, to the client device, the first output and the one or more data structures storing the association; and
- receive, from the client device, the second input and the one or more data structures storing the association.

20. The system of claim 11, wherein the plurality of identifier types further comprises at least one of: a name, a location, an identification number, an account identifier, or card number, and
- wherein the one or more processors are configured to select, from a plurality of placeholder templates for the corresponding plurality of identifier types, a placeholder template with which to generate the second data element.

* * * * *